US011858564B2

(12) United States Patent
Payne

(10) Patent No.: US 11,858,564 B2
(45) Date of Patent: Jan. 2, 2024

(54) VEHICLE WITH REPOSITIONABLE BALLAST

(71) Applicant: CNH Industrial America LLC, New Holland, PA (US)

(72) Inventor: Daniel Payne, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 17/404,751

(22) Filed: Aug. 17, 2021

(65) Prior Publication Data

US 2023/0057958 A1 Feb. 23, 2023

(51) Int. Cl.
*B62D 49/06* (2006.01)
*G01G 19/08* (2006.01)

(52) U.S. Cl.
CPC ......... *B62D 49/0628* (2013.01); *G01G 19/08* (2013.01)

(58) Field of Classification Search
CPC ... B62D 49/0628; B62D 49/085; B62D 37/04
See application file for complete search history.

(56) References Cited

U.S. PATENT DOCUMENTS

| 4,322,094 | A | 3/1982 | Bobard |
| 4,518,305 | A | 5/1985 | Stuhrmann |
| 4,861,069 | A | 8/1989 | Gunter |
| 8,131,433 | B2 | 3/2012 | Bordini |
| 8,919,813 | B2 | 12/2014 | Wrensch et al. |
| 8,925,964 | B1 | 1/2015 | Duppong et al. |
| 9,078,391 | B2 | 7/2015 | Pichlmaier |
| 9,617,711 | B2 | 4/2017 | Murtha |
| 9,957,001 | B1 | 5/2018 | Duppong |
| 10,293,874 | B2 | 5/2019 | Smith et al. |
| 10,676,141 | B2 * | 6/2020 | Schott ................. A01B 63/145 |
| 11,014,620 | B2 | 5/2021 | Dini |
| 11,433,956 | B2 | 9/2022 | Calcagnotto Da Silva et al. |

(Continued)

FOREIGN PATENT DOCUMENTS

| CN | 216332350 U | 4/2022 |
| DE | 32 23 990 | 12/1983 |

(Continued)

OTHER PUBLICATIONS

Berdiev et al., "Analysis of the Design of Lifting and Transporting Vehicles with a Variable Center of Gravity—A Literature and Patent Overview," International Journal of Engineering Trends and Technology vol. 69 Issue 12, 56-65, Dec. 2021.

*Primary Examiner* — Paul N Dickson
*Assistant Examiner* — Matthew D Lee
(74) *Attorney, Agent, or Firm* — Rickard K. DeMille; Rebecca L. Henkel

(57) ABSTRACT

A vehicle includes a frame, a first axle assembly coupled to the frame and including a first pair of tractive elements, a second axle assembly coupled to the frame and including a second pair of tractive elements, a prime mover coupled to the frame and configured to drive the first axle assembly and the second tractive assembly to propel the vehicle, a ballast movably coupled to the frame, and a ballast actuator configured to reposition the ballast relative to the frame to shift a center of gravity of the vehicle relative to the first axle assembly and the second axle assembly.

20 Claims, 15 Drawing Sheets

(56) References Cited

U.S. PATENT DOCUMENTS

| | | | |
|---|---|---|---|
| 2009/0206589 A1* | 8/2009 | Osswald | B62D 21/14 |
| | | | 187/234 |
| 2014/0089172 A1* | 3/2014 | Hyde | F02M 21/0209 |
| | | | 29/401.1 |
| 2016/0016470 A1* | 1/2016 | Pichlmaier | B60K 37/06 |
| | | | 701/34.2 |
| 2017/0242447 A1* | 8/2017 | Vik | E02F 9/02 |
| 2019/0382982 A1 | 12/2019 | Santo | |
| 2020/0151592 A1* | 5/2020 | Koch | B60K 37/06 |
| 2020/0247487 A1 | 8/2020 | Dini | |
| 2021/0086848 A1* | 3/2021 | Calcagnotto Da Silva | |
| | | | B62D 49/0628 |
| 2021/0282385 A1* | 9/2021 | Leeb | B62D 37/04 |
| 2022/0150392 A1* | 5/2022 | Maddox | A01B 69/001 |
| 2022/0281537 A1* | 9/2022 | Gono | B62D 7/1572 |

FOREIGN PATENT DOCUMENTS

| | | |
|---|---|---|
| DE | 32 23 990 A1 | 12/1983 |
| DE | 90 11 355 U | 11/1990 |
| DE | 10 2012 216 306 A | 3/2014 |
| DE | 10 2017 214 354 B | 9/2018 |
| EP | 0 126 919 A2 | 12/1984 |
| EP | 0 383 279 B1 | 4/1994 |
| EP | 2 042 411 A1 | 4/2009 |
| EP | 2 042 410 B1 | 3/2011 |
| EP | 2 330 024 | 6/2011 |
| EP | 2 441 651 A2 | 4/2012 |
| EP | 3 000 294 B1 | 3/2016 |
| EP | 3162178 A1 * 5/2017 ......... B62D 49/0628 |
| GB | 2 160 167 A | 12/1985 |
| WO | WO-2018/211463 | 11/2018 |

\* cited by examiner

US 11,858,564 B2

VEHICLE WITH REPOSITIONABLE BALLAST

BACKGROUND

The present disclosure relates generally to vehicles. More specifically, the present disclosure relates to vehicles with multiple driven axles. As the center of gravity of a vehicle shifts, the output power delivered to each axle of the vehicle varies. If the center of gravity of the vehicle falls outside of a particular range of positions, the power delivered by one of the axles may exceed the rated load, damaging or prematurely wearing the axle or other components of the driveline.

SUMMARY

One embodiment relates to a vehicle. The vehicle includes a frame, a first axle assembly coupled to the frame and including a first pair of tractive elements, a second axle assembly coupled to the frame and including a second pair of tractive elements, a prime mover coupled to the frame and configured to drive the first axle assembly and the second tractive assembly to propel the vehicle, a ballast movably coupled to the frame, and a ballast actuator configured to reposition the ballast relative to the frame to shift a center of gravity of the vehicle relative to the first axle assembly and the second axle assembly.

Another embodiment relates to a method of operating a vehicle. The method includes receiving, from a first load sensor, first load data related to a load on a front axle assembly of the vehicle, receiving, from a second load sensor, second load data related to a load on a rear axle assembly of the vehicle, determining, based on the first load data and the second load data, a desired position of a ballast that would shift a center of gravity of the vehicle to a desired range of positions, and controlling a ballast actuator to move the ballast to the desired position.

Still another embodiment relates to a ballast assembly for a vehicle. The ballast assembly includes a ballast, a ballast support coupled to the ballast and configured to movably couple the ballast to a frame of the vehicle, the ballast support permitting longitudinal movement of the ballast, a ballast actuator coupled to the ballast and configured to shift the ballast relative to the frame of the vehicle, a ballast position sensor configured to indicate a position of the ballast, and a controller operatively coupled to the ballast actuator and the ballast position sensor. The ballast actuator is configured to receive first torque data indicating a torque on a front axle of the vehicle, receive second torque data indicating a torque on a second axle of the vehicle, compare the first torque data and the second torque data, determine a desired position of the ballast based on the comparison of the first torque data and the second torque data, and control the ballast actuator to move the ballast to the desired position using feedback from the ballast position sensor.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle of the present disclosure includes a repositionable ballast assembly. During operation, the center of gravity of the vehicle may shift back and forth. By way of example, implements may be added to or removed from the vehicle, or an implement may experience different loadings (e.g., due to variation in the amount of material carried by the implement). As the center of gravity shifts, the amount of downward force on a front axle and a rear axle of the vehicle varies. By way of example, if the center of gravity of the vehicle is directly between the front axle and the rear axle, the front axle and the rear axle may each support approximately 50% of the weight of the vehicle. If the center of gravity moves closer to one axle, the weight supported by that axle increases, and the weight supported by the other axle decreases. If both the front axle and the rear axle of the vehicle are driven (e.g., the vehicle has a 4 wheel drive or all wheel drive configuration), the total output power of a prime mover of the vehicle (e.g., an engine) is divided between each axle. The grip or traction of the wheels of each axle is related to the amount of downward force on that axle. Accordingly, as the center of gravity of the vehicle shifts forward or rearward, the portion of the output power of the prime mover that is directed to each axle changes. If the center of gravity is outside of a desired range of positions, the stresses on one of the axles may increase, causing damage and/or premature wear.

The ballast assembly includes a ballast (e.g., a series of steel plates) and a ballast actuator that is configured to move the ballast relative to a frame of the vehicle. The ballast assembly is configured to counteract the effect of variations in vehicle loads, maintaining the center of gravity of the vehicle within a desired range of positions. For example, if an implement is coupled to the rear of the vehicle, this may shift the center of gravity of the vehicle rearward, increasing the loading on the rear axle. To counteract this shift, the ballast actuator may extend the ballast forward relative to the frame, shifting the center of gravity back toward the front of the vehicle and evening the load between the front and rear axles.

Overall Vehicle

Figure 1:
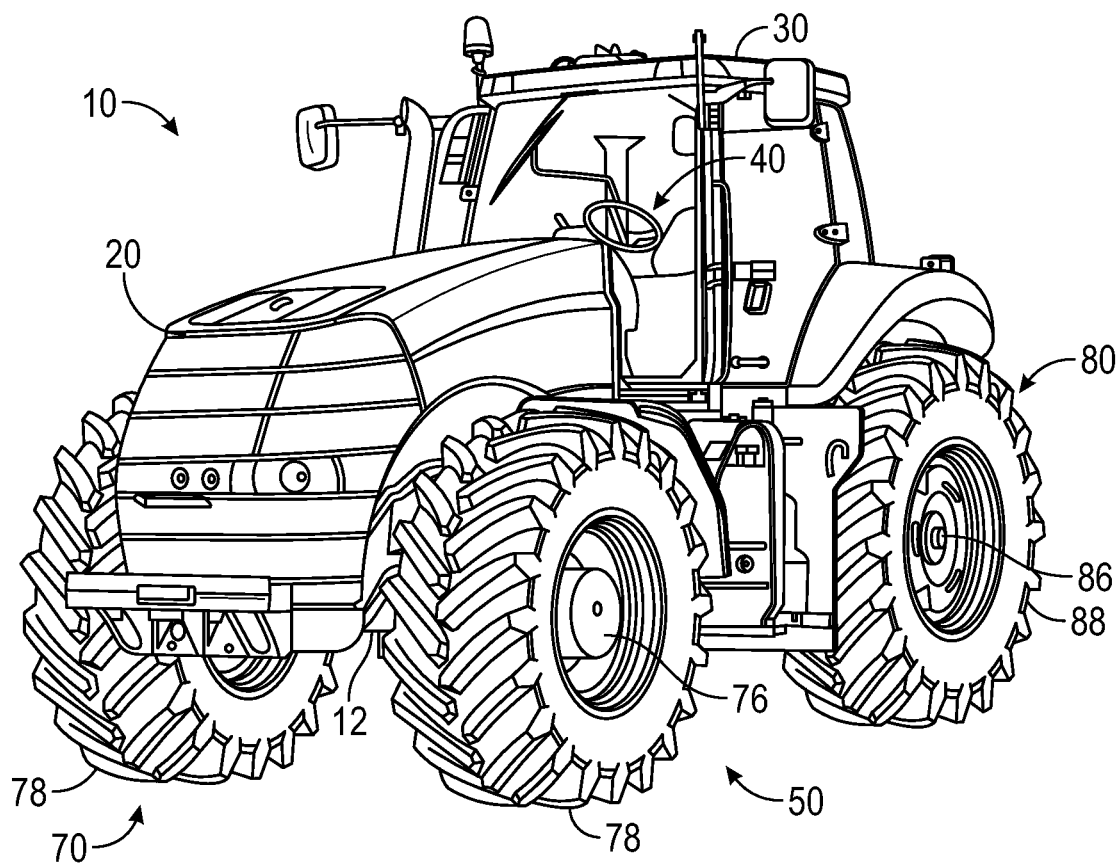
FIG. 1 is a perspective view of a vehicle, according to an exemplary embodiment.
Figure 2:
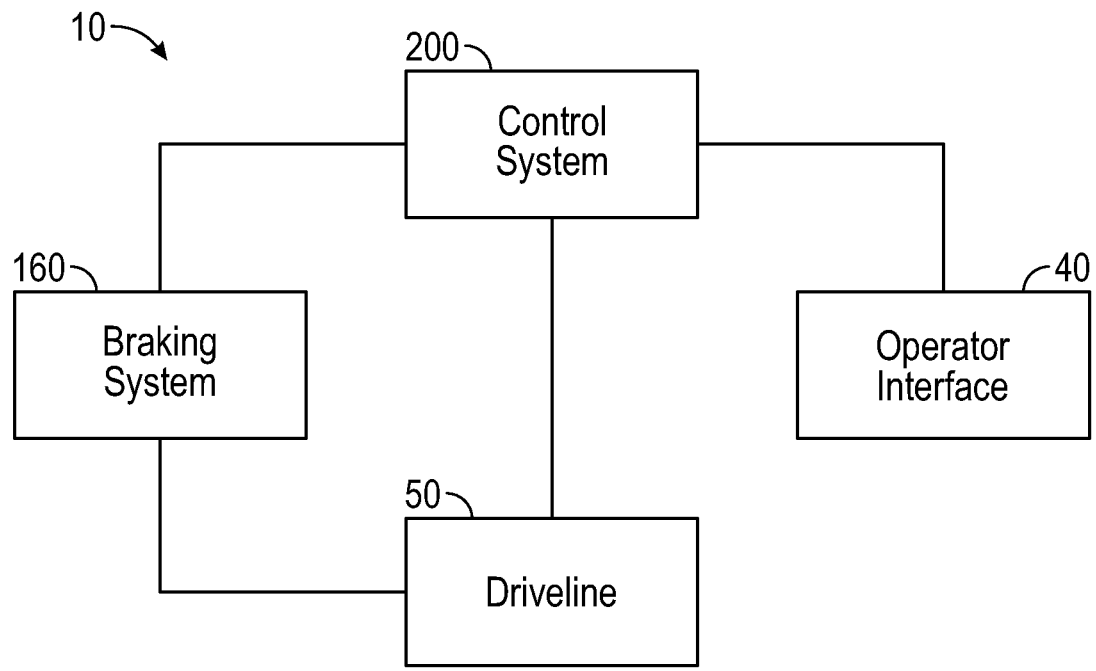
FIG. 2 is a schematic block diagram of the vehicle of FIG. 1, according to an exemplary embodiment.
Figure 3:
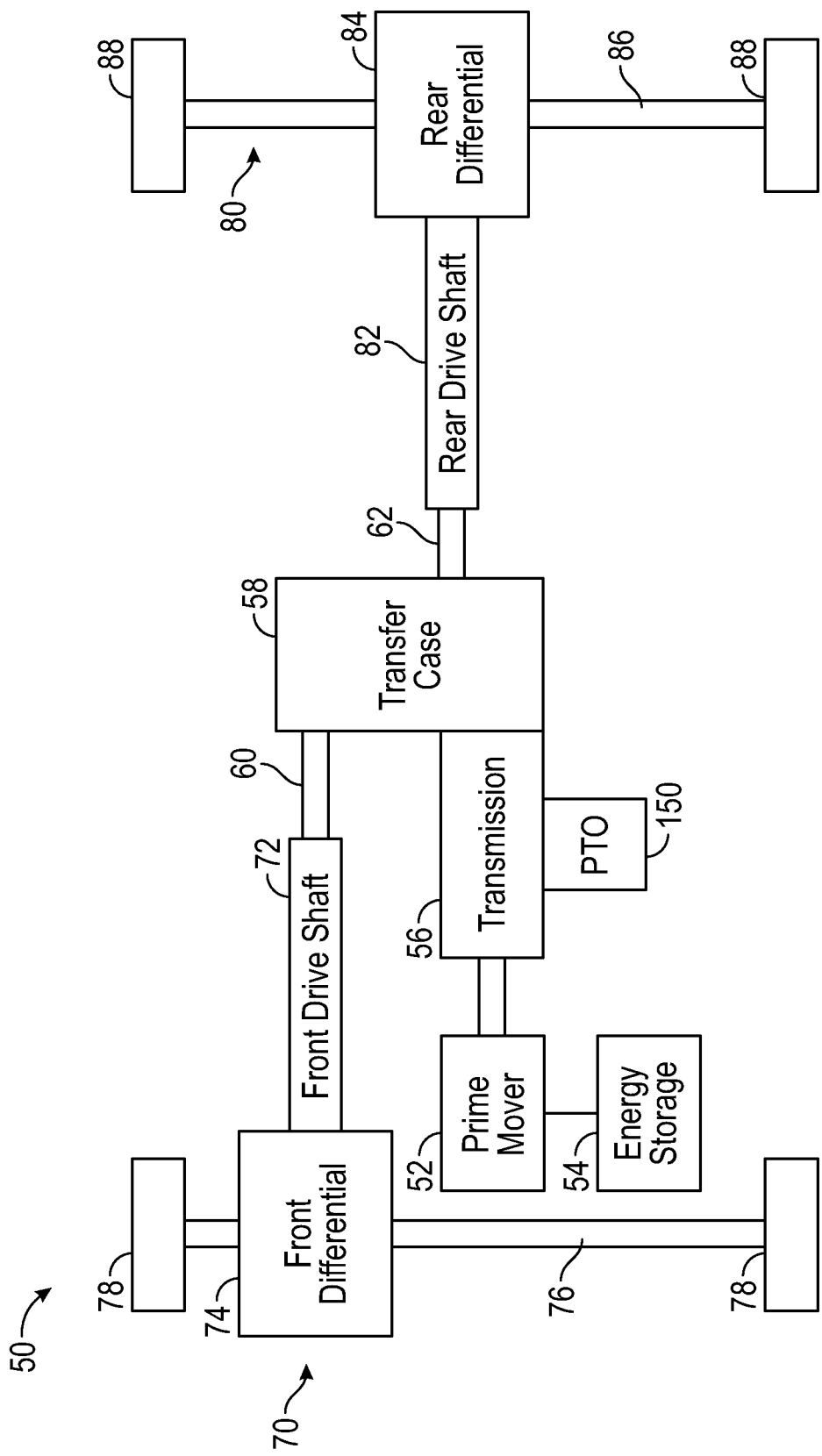
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 160, coupled to one or more components of the driveline 50 to facilitate selectively braking the one or more components of the driveline 50; and a vehicle control system, shown as control system 200, coupled to the operator interface 40, the driveline 50, and the braking system 160. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

Figure 5:
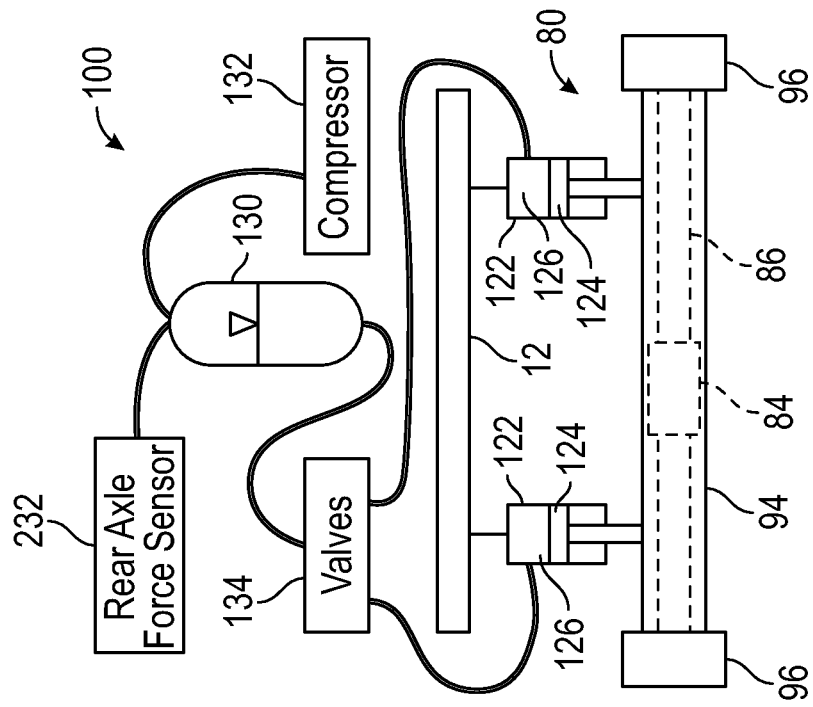
FIGS. 4 and 5 are schematic block diagrams of a suspension assembly of the vehicle of FIG. 1, according to an exemplary embodiment.
Figure 4:
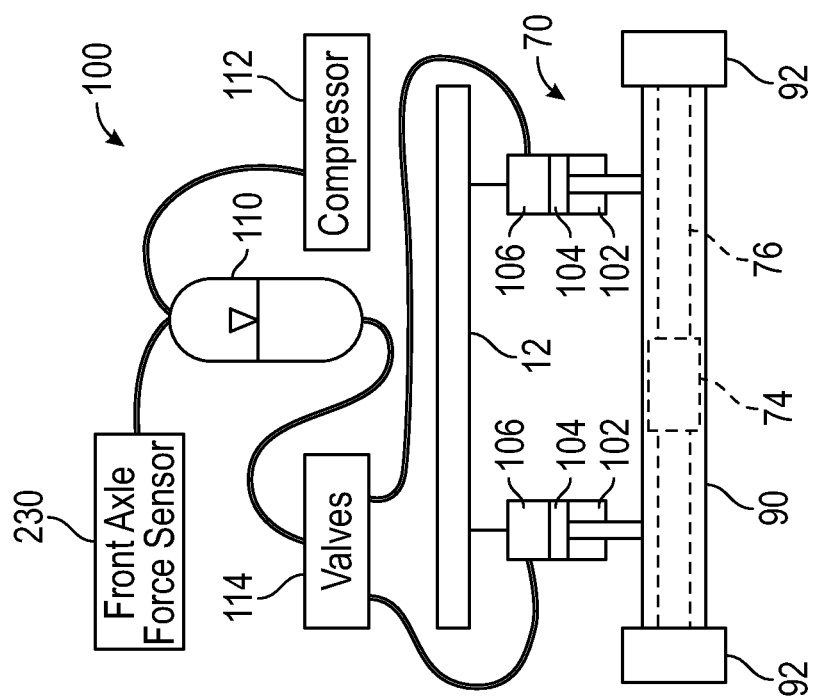
Figure 6:
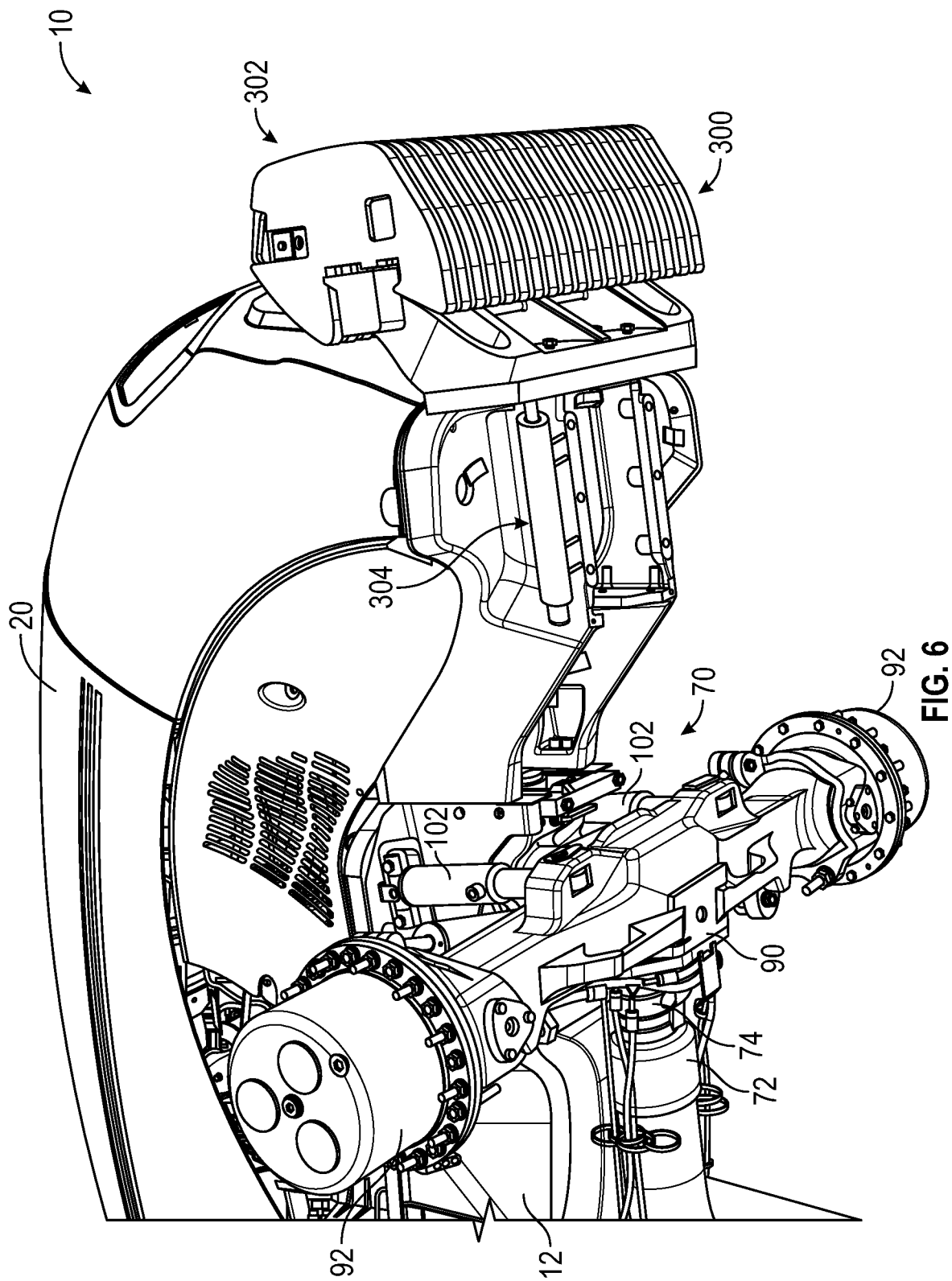
FIG. 6 is a bottom perspective view of the vehicle of FIG. 1 including a ballast assembly, according to an exemplary embodiment.

Referring to FIGS. 4-6, the front tractive assembly 70 includes a housing or outer structural member, shown as housing 90. The housing 90 at least partially contains the front differential 74 and the front axle 76. A pair of wheel hubs or wheel adapters, shown as wheel end assemblies 92, are rotatably coupled to each end of the housing 90. Each wheel end assembly 92 is coupled to the front axle 76 such that the front axle 76 drives the wheel end assemblies 92. The front tractive elements 78 are each coupled to one of the wheel end assemblies 92 such that the wheel end assemblies 92 drive the front tractive elements 78 to propel the vehicle 10. The front tractive elements 78 may be selectively coupled to the wheel end assemblies 92 (e.g., by a series of fasteners) to facilitate replacement of the front tractive elements 78. In some embodiments, each wheel end assembly 92 is pivotally coupled to the housing 90 such that each wheel end assembly 92 is rotatable about a substantially vertical axis to facilitate steering the vehicle 10.

Referring to FIGS. 4 and 5, the rear tractive assembly 80 includes a housing or outer structural member, shown as housing 94. The housing 94 at least partially contains the rear differential 84 and the rear axle 86. A pair of wheel hubs or wheel adapters, shown as wheel end assemblies 96, are rotatably coupled to each end of the housing 94. Each wheel end assembly 96 is coupled to the rear axle 86 such that the rear axle 86 drives the wheel end assemblies 96. The rear tractive elements 88 are each coupled to one of the wheel end assemblies 96 such that the wheel end assemblies 96 drive the rear tractive elements 88 to propel the vehicle 10. The rear tractive elements 88 may be selectively coupled to the wheel end assemblies 96 (e.g., by a series of fasteners) to facilitate replacement of the rear tractive elements 88. In some embodiments, each wheel end assembly 96 is pivotally coupled to the housing 94 such that each wheel end assembly 96 is rotatable about a substantially vertical axis to facilitate steering the vehicle 10.

The vehicle 10 further includes a suspension system, suspension assembly, or support assembly, shown as suspension assembly 100. The suspension assembly 100 is configured to control movement (e.g., vertical movement) of the front tractive assembly 70 and the rear tractive assembly 80 relative to the frame 12. The suspension assembly 100 may provide one or more upward, substantially vertical forces that counteract the effect of gravity on the vehicle 10. The suspension assembly 100 may provide a spring force (e.g., a force that varies based on the relative position of a tractive assembly with respect to the frame 12) and/or a dampening force (e.g., a force that varies based on the relative velocity of a tractive assembly with respect to the frame 12). The suspension assembly 100 may control the ride height of the vehicle 10 (e.g., the distance between the frame 12 and the ground) and/or the ride dynamics of the vehicle 10 (e.g., how the vehicle 10 reacts to a change in height of the ground, such as a bump or pothole).

Referring to FIGS. 4 and 6, the suspension assembly 100 includes a pair of actuators, cylinders, springs, dampers, or combination spring/dampers, shown as cylinders 102, that couple the frame 12 to the housing 90 of the front tractive assembly 70. The cylinders 102 each include a piston 104 that is exposed to a chamber or volume, shown as chamber 106. The chamber 106 is filled with a pressurized hydraulic fluid, such as hydraulic oil, that imparts a force on the piston 104. This forces the piston 104 outward, expanding the cylinder 102 and forcing the frame 12 upward, away from the front tractive assembly 70. The chambers 106 are fluidly coupled to a gas charged accumulator, shown as accumulator 110. The accumulator 110 contains a volume of pressurized gas (e.g., air, nitrogen, etc.) that presses against the pressurized hydraulic fluid. The force of the gas is transferred to the pistons 104 through the hydraulic fluid. The gas within the accumulator 110 is compressible such that the cylinders 102 act as springs.

In some embodiments, the suspension assembly 100 includes a compressor 112 that adds or removes pressurized gas from the accumulator 110 to adjust the ride height of the vehicle 10. Adjusting the amount of gas within the accumulator 110 varies the pressure of the gas for a given volume of hydraulic fluid within the accumulator 110. Accordingly, adjusting the amount of gas within the accumulator 110 adjusts the effective spring rate of the cylinders 102, which causes a vehicle 10 of a given weight to ride higher or lower.

In some embodiments, the suspension assembly 100 includes a valve assembly, shown as valves 114, that fluidly couple the cylinders 102 to the accumulator 110. In some embodiments, the valves 114 include one or more flow control valves (e.g., orifices) that resist the flow of fluid between the cylinders 102 and the accumulator 110. Accordingly, the valves 114 may cause the cylinders 102 to act as dampers.

In some embodiments, the suspension assembly 100 includes similar arrangements for the front tractive assembly 70 and the rear tractive assembly 80. Referring to FIG. 5, the suspension assembly 100 includes a pair of actuators, cylinders, springs, dampers, or combination spring/dampers, shown as cylinders 122, that couple the frame 12 to the housing 90 of the rear tractive assembly 80. The cylinders 122 each include a piston 124 that is exposed to a chamber or volume, shown as chamber 126. The chamber 126 is filled with a pressurized hydraulic fluid, such as hydraulic oil, that imparts a force on the piston 124. This forces the piston 124 outward, expanding the cylinder 122 and forcing the frame 12 upward, away from the rear tractive assembly 80. The chambers 126 are fluidly coupled to a gas charged accumulator, shown as accumulator 130. The accumulator 130 contains a volume of pressurized gas (e.g., air, nitrogen, etc.) that presses against the pressurized hydraulic fluid. The force of the gas is transferred to the pistons 124 through the hydraulic fluid. The gas within the accumulator 130 is compressible such that the cylinders 122 act as springs.

In some embodiments, the suspension assembly 100 includes a compressor 132 that adds or removes pressurized gas from the accumulator 120 to adjust the ride height of the vehicle 10. In some embodiments, the compressor 112 and the compressor 132 are combined as a single component. Adjusting the amount of gas within the accumulator 130 varies the pressure of the gas for a given volume of hydraulic fluid within the accumulator 130. Accordingly, adjusting the amount of gas within the accumulator 130 adjusts the effective spring rate of the cylinders 122, which causes a vehicle 10 of a given weight to ride higher or lower.

In some embodiments, the suspension assembly 100 includes a valve assembly, shown as valves 134, that fluidly couple the cylinders 122 to the accumulator 130. In some embodiments, the valves 134 include one or more flow control valves (e.g., orifices) that resist the flow of fluid between the cylinders 122 and the accumulator 130. Accordingly, the valves 134 may cause the cylinders 122 to act as dampers.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 150. While the PTO 150 is shown as being an output of the transmission 56, in other embodiments the PTO 150 may be an output of the prime mover 52, the transmission 56, and/or the transfer case 58. According to an exemplary embodiment, the PTO 150 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 160 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 160 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one more tractive elements (e.g., wheels, etc.) of the trailed implement.

Figure 7:
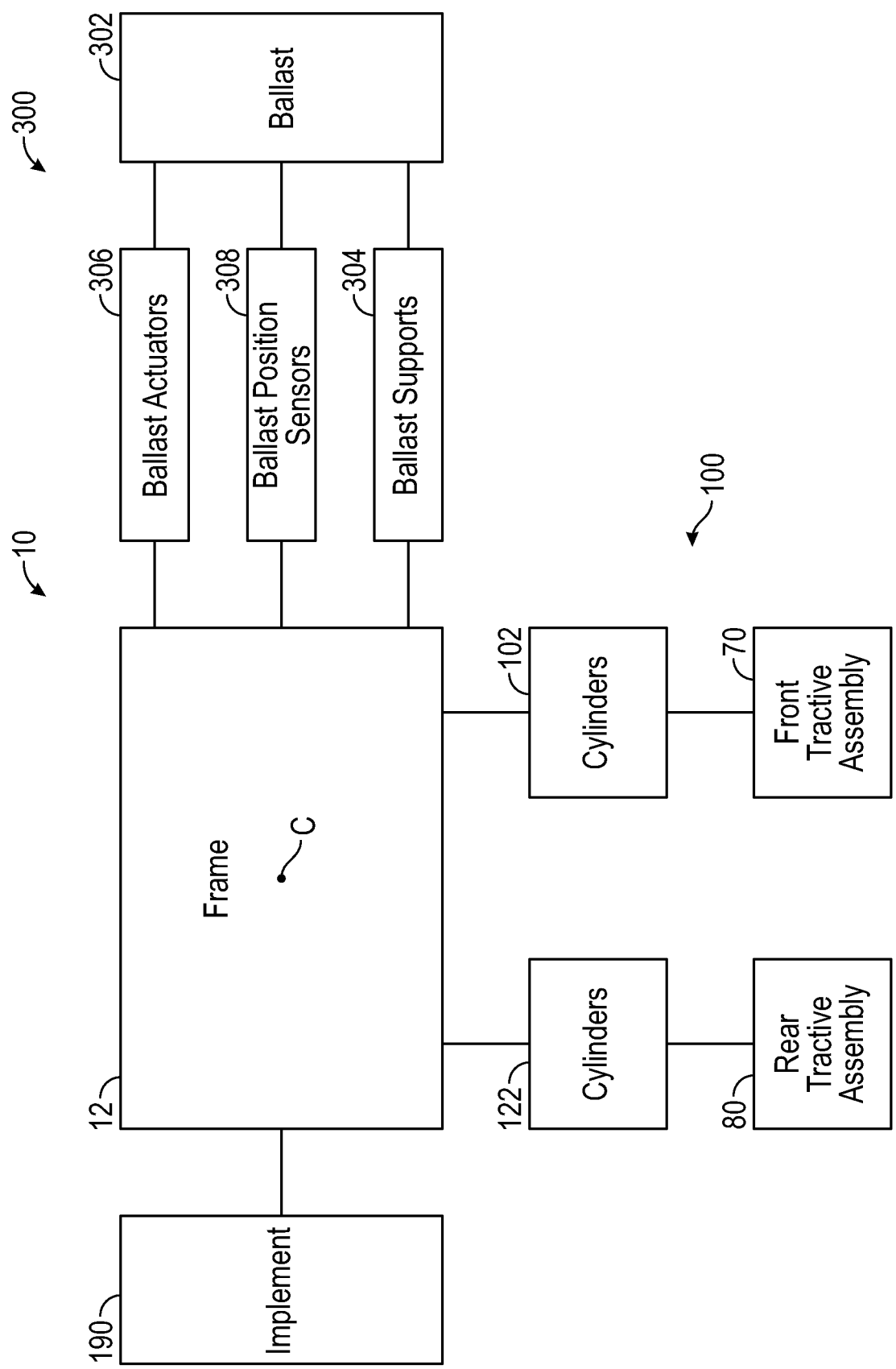
FIG. 7 is a schematic block diagram of the vehicle of FIG. 1, according to an exemplary embodiment.

Referring to FIG. 7, in some embodiments, the vehicle 10 includes a tool or implement, shown as implement 190, that is configured to facilitate the vehicle 10 performing one or more tasks or operations (e.g., planting, harvesting, moving material, etc.). The implement 190 may be partially supported by the frame 12 (e.g., as a trailer) or completely supported by the frame 12. The implement 190 may be removably coupled to the frame 12. In some embodiments, the implement 190 can be removed and replaced with a different implement 190 (e.g., to reconfigure the vehicle 10 for a different task or operation). As shown, the implement 190 is positioned rearward of the frame 12. In other configurations, the implement 190 is forward of the frame 12, above the frame 12, below the frame 12, or otherwise positioned relative to the frame 12. The implements may be powered (e.g., through the PTO 150) or unpowered. The implements 190 may include front end loaders, backhoes, graders, snow plows, buckets, grapples, field plows, trailers, mowers, rakes, lifting forks, cranes, cultivators, rotary tillers, tillage discs, harvesters (e.g., for corn, wheat, soy beans, cotton, carrots, etc.), planters, sprayers, fertilizer applicators, or other types of tools.

Repositionable Ballast Assembly

Referring to FIG. 7, the vehicle 10 includes a movable weight assembly, a repositionable ballast assembly, a center of gravity adjustment assembly, or a repositionable ballast assembly, shown as ballast assembly 300. The ballast assembly 300 is configured to move a large weight relative to the frame 12 of the vehicle 10, varying a location of a center of gravity C of the vehicle 10. The ballast assembly 300 is coupled to the frame 12. As shown, the ballast assembly 300 extends forward from the frame 12. In other embodiments, the ballast assembly 300 is otherwise positioned (e.g., the ballast assembly 300 extends rearward from the frame 12, the ballast assembly 300 is at the same longitudinal position as the frame 12, etc.).

The ballast assembly 300 includes a weight assembly, shown as ballast 302. The ballast 302 is configured to be a large portion of the overall weight of the vehicle 10. In some embodiments, the ballast 302 makes up approximately 5% of the overall weight of the vehicle 10. In some embodiments, the ballast 302 is approximately 2000 lbs. In one embodiment, the ballast 302 is 2160 lbs, and the overall weight of the vehicle 10 is 41,175 lbs. To facilitate packaging the large weight within the vehicle 10, the ballast 302 may be made from a relatively dense material. In some embodiments, the ballast 302 is made from steel or cast iron. In some embodiments, the ballast 302 is a volume of liquid, such as water. In some embodiments, the ballast 302 is a volume of flowable solid material, such as sand. The ballast 302 may be reconfigurable between different weights. By way of example, material may be added or removed from the ballast 302 to vary the weight of the ballast 302.

The ballast 302 is coupled to the frame 12 by one or more support members or support assemblies, shown as ballast supports 304. Specifically, the ballast supports 304 movably couple the ballast 302 to the frame 12 such that the ballast 302 is movable relative to the frame 12. The ballast supports 304 may facilitate selective repositioning of the ballast 302 longitudinally relative to the frame 12 (e.g., forward and/or rearward relative to the frame 12).

The ballast assembly 300 further includes one or more actuators, shown as ballast actuators 306. The ballast actuators 306 are coupled to the frame 12 and the ballast 302. In some embodiments, the ballast actuators 306 include electric motors, hydraulic cylinders, and/or pneumatic cylinders. The ballast actuators 306 are configured to move the ballast 302 relative to the frame 12. Accordingly, the ballast actuators 306 are configured to move the center of gravity C of the vehicle 10. In some embodiments, the ballast actuators 306 are configured to move the ballast 302 longitudinally relative to the frame 12. Accordingly, the ballast actuators 306 may be configured to move the center of gravity C of the vehicle 10 longitudinally.

In some embodiments, the ballast assembly 300 includes one or more sensors, shown as ballast position sensors 308. The ballast position sensors 308 may be coupled to the frame 12, the ballast 302, the ballast supports 304, and/or the ballast actuators 306. The ballast position sensors 308 are configured to provide position data indicating a position of the ballast 302 (e.g., relative to the frame 12). The ballast position sensors 308 may indicate a relative position of the ballast 302. By way of example, the ballast 302 may have a "home" or "zero" position, and the ballast position sensors 308 may measure the displacement of the ballast 302 from the zero position (e.g., 2 inches forward, 10 inches rearward, etc.). In some embodiments, the ballast position sensors 308 are configured to indicate a longitudinal position of the ballast 302.

Control System

Figure 8:
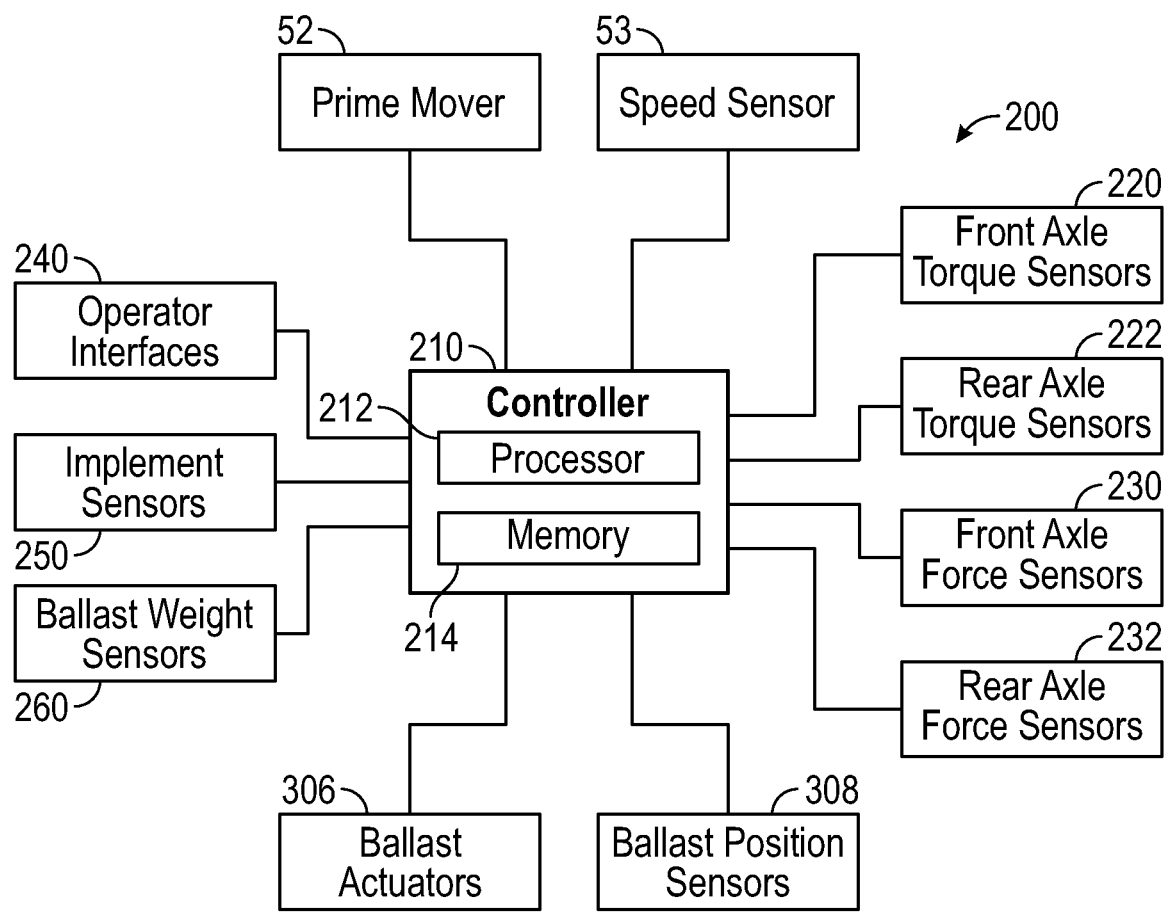
FIG. 8 is a schematic block diagram of a control system of the vehicle of FIG. 1, according to an exemplary embodiment.

Referring to FIG. 8, the control system 200 is shown according to an exemplary embodiment. The control system 200 may facilitate operation of the ballast assembly 300. The control system 200 includes processing circuitry, shown as controller 210. The controller 210 includes a processor 212 and a memory device, shown as memory 214. The processor 212 may be configured to execute one or more instructions stored on the memory 214 to perform one or more of the processes described herein. The controller 210 may be configured to receive information from one or more devices (e.g., sensors, user interfaces, etc.) and/or to provide information (e.g., notifications, commands, etc.) to one or more devices (e.g., actuators, user interfaces, etc.).

The controller 210 is operably coupled to the other devices of the control system 200. By way of example, the controller 210 may include a communication interface to facilitate communication with the other devices. In some embodiments, the devices of the control system 200 utilize wired communication (e.g., Ethernet, USB, serial, etc.). In some embodiments, the devices of the control system 200 utilize wireless communication (e.g., Bluetooth, Wi-Fi, Zigbee, cellular communication, satellite communication, etc.). The devices of the control system 200 may communicate over a network (e.g., a local area network, a wide area network, the Internet, a CAN bus, etc.).

As shown in FIG. 8, the controller 210 is operatively coupled to the prime mover 52. The controller 210 may provide commands to the prime mover 52. By way of example, the controller 210 may control the rotational speed of the prime mover 52. In one such example, the prime mover 52 is an engine, and the controller 210 provides commands that limit a rotational speed of the engine to a maximum speed.

In some embodiments, the control system 200 further includes a sensor, shown as speed sensor 53, that is operatively coupled to the controller 210. The speed sensor 53 may provide speed data indicating a rotational speed of the prime mover 52. The controller 210 may utilize the speed data in a feedback loop to control the rotational speed of the prime mover 52.

As shown in FIG. 8, the controller 210 is operatively coupled to the ballast actuators 306 and the ballast position sensors 308. The controller 210 may provide commands to the ballast actuators 306. By way of example, the controller 210 may control the ballast actuators 306 to move the ballast 302 relative to the frame 12. The controller 210 may receive information from the ballast position sensors 308. By way of example, the controller 210 may receive position data from the ballast position sensor 308 indicating the position of the ballast 302 relative to the frame 12. The controller 210 may utilize the position data in a feedback loop to control the position of the ballast 302.

As shown in FIG. 8, the control system 200 further includes two or more load sensors (e.g., torque transducers), shown as front axle torque sensors 220 and rear axle torque sensors 222. The front axle torque sensors 220 may provide load data (e.g., torque data) indicating a torque on the front tractive assembly 70. By way of example, the front axle torque sensors 220 may be coupled to one or more of the front output 60, the front drive shaft 72, the front differential 74, the front axle 76, or the front tractive elements 78. In one such example, a front axle torque sensor 220 is positioned along the front drive shaft 72 and provides torque data indicating a torque on the front drive shaft 72. The rear axle torque sensors 222 may provide load data (e.g., torque data) indicating a torque on the rear axle 86. By way of example, the rear axle torque sensors 222 may be coupled to one or more of the rear output 62, the rear drive shaft 82, the rear differential 84, the rear axle 86, or the rear tractive elements 88. In one such example, a rear axle torque sensor 222 is positioned along the rear drive shaft 82 and provides torque data indicating a torque on the rear drive shaft 82.

Referring to FIGS. 4, 5, and 8, the control system 200 includes two or more load sensors (e.g., strain gauges, pressure sensors, transducers, etc.), shown as front axle force sensors 230 and rear axle force sensors 232. The front axle force sensors 230 may provide load data (e.g., force data) indicating a force on the front tractive assembly 70 (e.g., a force between the front tractive assembly 70 and the frame 12, a force imparted by the front tractive assembly 70 on the ground, etc.). The rear axle force sensors 232 may provide load data (e.g., force data) indicating a force on the rear axle 86 (e.g., a force between the rear tractive assembly 80 and the frame 12, a force imparted by the rear tractive assembly 80 on the ground, etc.). In some embodiments, a relationship between (a) the output of the front axle force sensors 230 and/or the rear axle force sensors 232 and (b) the force on the corresponding axle assembly may be predetermined and stored in the memory 214. Alternatively, the controller 210 may directly compare the output of the front axle force sensors 230 and the rear axle force sensors 232.

In some embodiments, the front axle force sensors 230 and/or the rear axle force sensors 232 are pressure sensors configured to measure a pressure within the suspension assembly 100. As shown in FIG. 4, a front axle force sensor 230 is a pressure sensor configured to measure a pressure of the gas within the accumulator 110. In other embodiments, the front axle force sensor 230 is configured to measure a different pressure within the suspension assembly 100. By way of example, the front axle force sensor 230 may measure a pressure of the hydraulic fluid within the accumulator 110, a pressure of the hydraulic fluid between the accumulator 110 and one of the cylinders 102, and/or a pressure within a chamber 106 of one of the cylinders 102. The measured pressure may provide an indication of the pressure within the chamber 106, which controls the output force of the corresponding cylinder 102. The relationship between the measured pressure and the force on the front tractive assembly 70 may be predetermined and stored in the memory 214.

As shown in FIG. 5, a rear axle force sensor 232 is a pressure sensor configured to measure a pressure of the gas within the accumulator 130. In other embodiments, the rear axle force sensor 232 is configured to measure a different pressure within the suspension assembly 100. By way of example, the rear axle force sensor 232 may measure a pressure of the hydraulic fluid within the accumulator 130, a pressure of the hydraulic fluid between the accumulator 130 and one of the cylinders 122, and/or a pressure within a chamber 126 of one of the cylinders 122. The measured pressure may provide an indication of the pressure within the chamber 126, which controls the output force of the corresponding cylinder 122. The relationship between the measured pressure and the force on the rear tractive assembly 80 may be predetermined and stored in the memory 214.

In some embodiments, the front axle force sensors 230 and/or the rear axle force sensors 232 are otherwise configured to provide a measurement indicative of the force on the front tractive assembly 70 and/or the rear tractive assembly 80. By way of example, the front axle force sensors 230 and/or the rear axle force sensors 232 may include strain gauges positioned on one or more components of the front tractive assembly 70, the rear tractive assembly 80, the suspension assembly 100, the frame 12, and/or other components that experience forces from the front tractive assembly 70 and/or the rear tractive assembly 80. These forces impart strain a strain on the component that can be measured by a strain gauge. The relationship between the measured strain and the force on the front tractive assembly 70 and/or the rear tractive assembly 80 may be predetermined and stored in the memory 214.

In some embodiments, the control system 200 includes one or more input devices, output devices, user interfaces, or operator interfaces, shown as operator interfaces 240. The operator interfaces 240 may be built into the vehicle 10 (e.g., positioned within the cab 30, positioned along the exterior of the vehicle 10, etc.). Alternatively, the operator interfaces 240 may be portable and/or separable from the vehicle 10. For example, the operator interfaces 240 may include one or more user devices, such as smartphones, tables, laptops, desktops, pagers, or other user devices. The operator interfaces 240 may include one or more input devices configured to receive inputs (e.g., commands) from an operator to facilitate operator control over the vehicle 10. By way of example, the operator interfaces 240 may include touch screens, buttons, steering wheels, pedals, levers, switches, knobs, keyboards, mice, microphones, and/or other input devices. The operator interfaces 240 may include one or more output devices configured to provide information to an operator (e.g., notifications, operating conditions, etc.). By way of example, the operator interfaces 240 may include screens, lights, speakers, haptic feedback devices, and/or other output devices.

In some embodiments, the control system 200 includes one or more sensors, shown as implement sensors 250, that are operatively coupled to the controller 210. The implement sensors 250 may be configured to provide implement data indicating what type of implement 190 is coupled to the frame 12. By way of example, the implement sensors 250 may provide a serial number or identification number that identifies the implement 190. A list correlating the identification number to various aspects of the implement 190 (e.g., compatibility with the vehicle 10, size, weight, attachment location on the frame 12, etc.) may be predetermined and stored in the memory 214. In some embodiments, the implement sensors 250 are configured to recognize, read, or otherwise interact with an identifier on the implement 190. By way of example, the implement 190 may include a QR code, a bar code, an RFID tag, or an NFC tag positioned to be read by a corresponding scanner of the implement sensor 250. The implement sensor 250 may be positioned to interact with the identifier when the implement 190 is coupled to the frame 12.

In some embodiments, the control system 200 includes one or more sensors, shown as ballast weight sensors 260, that are operatively coupled to the controller 210. The ballast weight sensors 260 are configured to provide weight data indicating a weight or mass of the ballast 302. By way of example, the ballast weight sensors 260 may include one or more load cells that measure the weight of the ballast 302 directly. By way of another example, the ballast weight sensors 260 may include one or more strain gauges that measure the strain of a component that supports the ballast 302. The relationship between the measured strain and the weight of the ballast 302 may be predetermined and stored in the memory 214. By way of another example, the ballast weight sensor 260 may include limit switches, break beam sensors, or floats that determine whether or not the ballast 302 is present at a predetermined location. By way of example, the ballast 302 may include a series of weights, each weight having a predetermined mass. The ballast weight sensors 260 may include a series of limit switches that are each activated when a weight is added to the ballast 302. Accordingly, the weight of the ballast 302 may be calculated by multiplying the weight of each weight by the number of switches that have been activated. By way of another example, the ballast 302 may include a volume of fluid within a container, and the ballast weight sensors 260 may be configured to determine the height of the fluid within the container. The geometry of the container and height of the fluid may be used to determine the volume of the fluid, and the density of the fluid may be used to determine the weight of the ballast 302.

System Operation

During operation, the vehicle 10 may experience various loadings that vary the location of the center of gravity C of the vehicle 10. By way of example, an implement 190 may be attached to the front or rear of the frame 12, moving the center of gravity C toward the implement 190. By way of another example, the implement 190 may be removed and exchanged with an implement of a different weight, shape, or size, shifting the center of gravity C. By way of another example, material may be added to or removed from the vehicle 10, shifting the center of gravity C.

As the center of gravity C (e.g., the center of gravity of the sprung mass of the vehicle 10 that is supported by the suspension assemblies 100) shifts longitudinally relative to the front tractive assembly 70 and the rear tractive assembly 80, the amount of downward force on the front tractive assembly 70 (e.g., 20,000 lbs) and the amount of downward force on the rear tractive assembly 80 varies, and the ratio (e.g., 50:50, 20,000:20,000, 2:3, etc.) between the downward force on the front tractive assembly 70 and the downward force on the rear tractive assembly 80 (i.e., the downward force ratio) varies. Accordingly, the downward force ratio is based on the longitudinal position of the center of gravity C. The downward forces on the front tractive assembly 70 and the rear tractive assembly 80 are counteracted by the normal force of the ground acting on the front tractive elements 78 and the rear tractive elements 88. Accordingly, the traction or grip of the front tractive elements 78 and the rear tractive elements 88 (e.g., the amount of torque that the front tractive elements 78 and the rear tractive elements 88 can impart without slipping) are related to (e.g., a function of, proportional to) the downward force on the front tractive assembly 70 and the rear tractive assembly 80, respectively. In some embodiments, the relative speeds of the front drive shaft 72 and the rear drive shaft 82 are fixed (e.g., the driveline 50 does not include a differential that permits a change in speed of the front drive shaft 72 relative to the rear drive shaft 82). Accordingly, the power delivered by the prime mover 52 is divided between the front tractive assembly 70 and the rear tractive assembly 80 based on the position of the center of gravity C.

As the power directed through one portion of the driveline 50 increases, the stresses experienced by that portion of the driveline 50 also increase. Accordingly, the center of gravity C shifts further from the center of the vehicle 10, the maximum stresses experienced by the driveline 50 increase. Accordingly, if the center of gravity C moves beyond a preferred or threshold range of longitudinal positions, the stresses experienced by part of the driveline 50 (e.g., the front tractive assembly 70 and/or the rear tractive assembly 80) may exceed a rated stress, causing damage or premature wear to one or more components.

Figure 9:
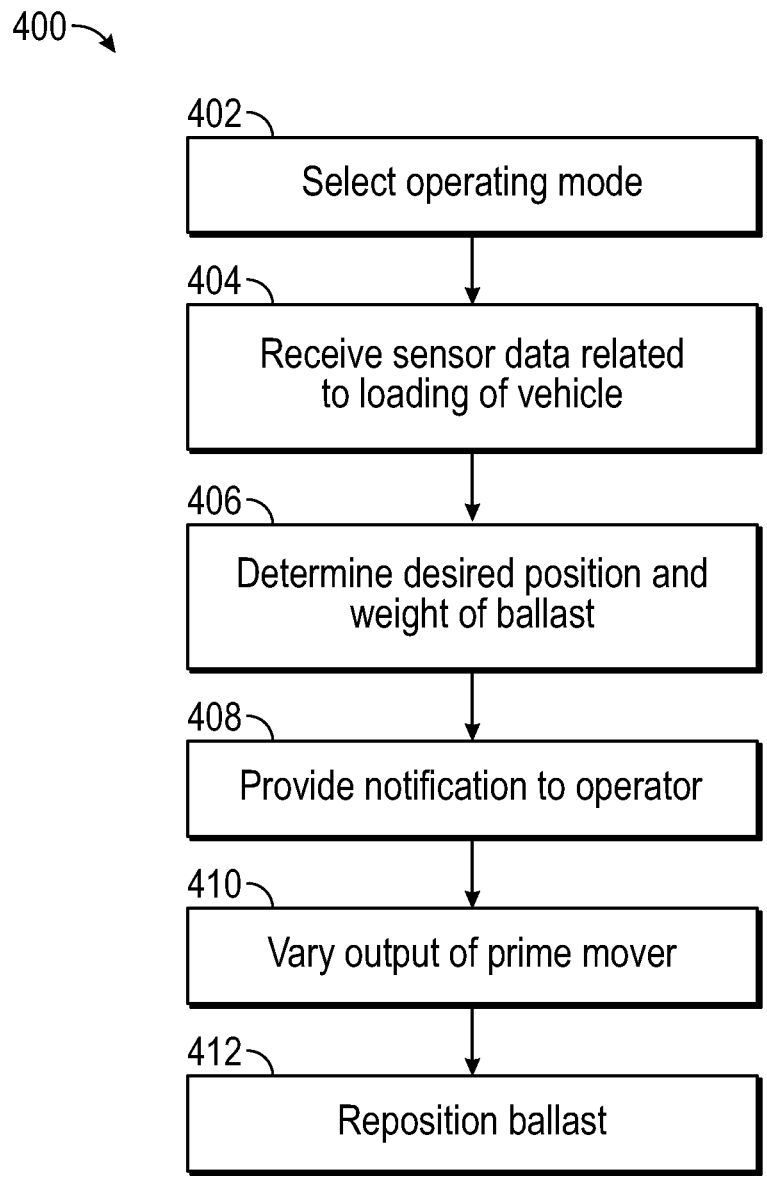
FIG. 9 is a schematic block diagram of a method of operating the vehicle of FIG. 1, according to an exemplary embodiment.

Referring to FIG. 9, a method 400 of operating the vehicle 10 is shown according to an exemplary embodiment. The method 400 utilizes the ballast assembly 300 to manipulate the location of the center of gravity C, thereby limiting the stresses throughout the driveline 50. For example, as the center of gravity C shifts in a first direction, the method 400 may move the ballast 302 in an opposing direction to counteract the shift of the center of gravity C and minimize the stresses throughout the driveline 50.

In step 402 of the method 400, an operating mode of the vehicle 10 is selected. The operating mode may indicate a type of operation that is being performed by the vehicle 10. Additionally or alternatively, the operating mode may indicate the type of implement that is coupled to the frame 12. By way of example, in a harvesting mode of operation, the implement 190 may be a harvester, and the vehicle 10 may be used to harvest crops. By way of another example, in a towing mode of operation, the implement 190 may be a trailer, and the vehicle 10 may be used to tow the trailer and a load supported by the trailer. By way of another example, in a no-implement mode of operation, the vehicle 10 may not include an implement 190.

In some embodiments, the operating mode is selected by an operator. By way of example, the operator may select the operating mode from a list of operating modes provided by an operator interface 240. The list of operating modes may be predetermined (e.g., by the controller 210) and stored in the memory 214. The list of operating modes may be determined based on the capabilities of the vehicle 10 and/or a list of implements 190 available to the operator. By way of example, an operator or manufacturer may input (e.g., using an operator interface 240) a model number of the vehicle 10 and/or one or more characteristics of the vehicle 10 (e.g., size of the prime mover 52, types of hitches available on the vehicle 10, etc.). By way of another example, an operator may input (e.g., using an operator interface 240) a list of implements 190 owned by the operator.

In some embodiments, the controller 210 selects the operating mode based on the type of implements 190 currently coupled to the frame 12 of the vehicle 10. In some embodiments, the operator inputs (e.g., using the operator interface 240) a list of the implements 190 that are currently coupled to the frame 12. In some embodiments, the implement sensors 250 detect which implements 190 are coupled to the frame 12. A list correlating each implement 190 with a corresponding operating mode may be predetermined and stored in the memory 214.

In step 404 of the method 400, one or more sensors provide sensor data related the loading of the vehicle 10. Specifically, the front axle torque sensors 220, the rear axle torque sensor 222, the front axle force sensors 230, and/or the rear axle force sensors 232 may provide load data indicating the load on (e.g., force on, torque on, power output through) the front the front tractive assembly 70 and/or the rear tractive assembly 80. The controller 210 may utilize the load data to determine a position of the center of gravity C and/or to detect a shift in the position of the center of gravity C. In some embodiments, the controller 210 may compare (a) the load data from the front axle torque sensors 220 and/or the front axle force sensors 230 with (b) the load data from the rear axle torque sensors 222 and/or the rear axle force sensors 232 to determine the position of the center of gravity C and/or to determine a shift in the position of the center of gravity C.

In some embodiments, the controller 210 compares the load data (e.g., measured torques) from the front axle torque sensors 220 with the load data from the rear axle torque sensors 222. A relationship between (a) a torque on the front tractive assembly 70, (b) a torque on the rear tractive assembly 80, and (c) a longitudinal position of the center of gravity C may be predetermined and stored in the memory 214. As the torque on the front tractive assembly 70 changes relative to the torque on the rear tractive assembly 80, the controller 210 may determine that the center of gravity C has moved longitudinally. By way of example, coupling an implement 190 (e.g., a trailer) to the rear end of the frame 12 may increase the torque on the rear tractive assembly 80 relative to the torque on the front tractive assembly 70 and shift the center of gravity C rearward. The controller 210 may utilize the load data to determine (a) that the center of gravity C has shifted rearward and/or (b) the distance that the center of gravity C as shifted.

In some embodiments, the controller 210 compares the load data (e.g., measured forces) from the front axle force sensors 230 with the load data from the rear axle force sensors 232. A relationship between (a) a force on the front tractive assembly 70, (b) a force on the rear tractive assembly 80, and (c) a longitudinal position of the center of gravity C may be predetermined and stored in the memory 214. As the force on the front tractive assembly 70 changes relative to the force on the rear tractive assembly 80, the controller 210 may determine that the center of gravity C has moved longitudinally. By way of example, removing material (e.g., water, soil, etc.) from an implement 190 (e.g., a sprayer) that is coupled to the rear end of the frame 12 may decrease the force on the rear tractive assembly 80 relative to the force on the front tractive assembly 70 and shift the center of gravity C forward. The controller 210 may utilize the load data to determine (a) that the center of gravity C has shifted forward and/or (b) the distance that the center of gravity C as shifted.

In step 406 of the method 400, a desired position (e.g., a target position) and a desired weight (e.g., a desired weight) of the ballast 302 are determined. In some embodiments, the controller 210 determines the desired position of the ballast 302 based on the operating mode of the vehicle 10. For a given operating mode, (a) a loading of the vehicle 10, (b) the corresponding shift in the position of the center of gravity C, and/or (c) a responsive movement of the ballast 302 that counteracts the shift of the center of gravity C may be predetermined and stored in the memory 214. By way of example, in a harvesting mode, a harvester may be coupled to the front end of the frame 12, shifting the center of gravity C forward. To counteract this shift, the ballast 302 may be moved to a desired position that is offset a distance rearward from a previous position of the ballast 302. The desired position of the ballast 302 may be predetermined (e.g., experimentally, mathematically, etc.) and stored in the memory 214.

In some embodiments, the controller 210 determines the desired positon of the ballast 302 based on the load data received in step 404. By way of example, a desired range of positions may be defined for the center of gravity C. The desired range of positions may correspond a minimized stress on the driveline 50. The controller 210 may utilize the load data to determine when the center of gravity C has left the desired range of positions. In response to such a determination, the controller 210 may determine that the ballast 302 should be moved to return the center of gravity C to the desired range of positions. The controller 210 may determine a desired position of the ballast 302, or the controller 210 may determine a direction that the ballast 302 should be moved to return the center of gravity C to the desired range of positions. By way of example, if the load data indicates that the center of gravity C has moved forward of the desired range of positions, the controller 210 may determine that the ballast 302 should move rearward to return the center of gravity C to the desired range of positions.

In some embodiments, the controller 210 determines a target weight of the ballast 302. The ballast 302 may have a range of motion, within which the ballast 302 is permitted to move. Movement of the ballast 302 outside of the range of motion may be prevented. By way of example, the ballast 302 may reach a hard stop that prevents movement of the ballast 302 beyond the range of motion. By way of another example, the ballast actuator 306 may have a limited range of motion that defines the range of motion of the ballast 302. In some embodiments, the range of motion of the ballast 302 may be predetermined and stored in the memory 214.

In certain situations, the ballast 302 may be unable to fully counteract a shift of the center of gravity C within the range of motion. By way of example, if an implement 190 having a large mass is coupled to the rear end of the frame 12, the ballast 302 may reach the forward end of the range of motion before the center of gravity C returns to the desired range of positions. In such an example, it may be desirable to add mass or weight to the ballast 302. This added weight may increase the effect of the ballast 302, shifting the center of gravity C forward into the desired range of positions. By way of another example, if an implement 190 having a large mass is removed from the rear end of the frame 12, the ballast 302 may reach the rear end of the range of motion before the center of gravity C returns to the desired range of positions. In such an example, it may be desirable to remove mass or weight from the ballast 302. This reduction in weight may reduce the effect of the ballast 302, shifting the center of gravity C rearward into the desired range of positions.

In some embodiments, the controller 210 is configured to determine that weight should be added to or removed from the ballast 302. In some such embodiments, the controller 210 is configured to determine that weight should be added to or removed from the ballast 302 in response to the ballast 302 reaching the end of the range of motion without the center of gravity C reaching the desired range of positions. The controller 210 may utilize feedback from a ballast position sensor 308 to determine when the ballast 302 has reached the end of the range of motion. If the ballast 302 reaches the end of the range of motion that is farthest from the center of gravity C, the controller 210 may determine that additional weight should be added to the ballast 302. If the ballast 302 reaches the end of the range of motion that is closest to the center of gravity C, the controller 210 may determine that weight should be removed from the ballast 302.

In some embodiments, the controller 210 may determine that weight should be added to or removed from the ballast 302 prior to repositioning the ballast 302. The controller 210 may determine the current position of the ballast 302 within the range of motion using a ballast position sensor 308. The controller 210 may determine the current weight of the ballast 302 using the ballast weight sensor 260. Using the current position of the ballast 302, the current weight of the ballast 302, load data, and the geometry of the vehicle 10, the controller 210 may determine if the ballast 302 is capable of returning the center of gravity C to the desired range of positions without exceeding the range of motion of the ballast 302. If the controller 210 determines that the ballast 302 is capable of returning the center of gravity C to the desired range of positions without exceeding the range of motion of the ballast 302, the controller 210 may determine the desired position of the ballast 302 for the current weight of the ballast 302. If the controller 210 determines that the ballast 302 is not capable of returning the center of gravity C to the desired range of positions without exceeding the range of motion of the ballast 302, the controller 210 may determine that additional weight should be added to the ballast 302 or that weight should be removed from the ballast 302.

In step 408 of the method 400, a notification is provided to the operator. The controller 210 may provide the notification through the operator interface 240 (e.g., as a message on a screen, as a sound, etc.). In configurations where the controller 210 determines that weight should be added to or removed from the ballast 302 (e.g., in step 406), the controller 210 may provide a notification instructing the operator to add or remove weight to the ballast 302. The notification may also tell the operator how much weight should be added or removed. By way of example, the operator interface 240 may provide a text notification stating "please add 300 pounds to the front ballast" or "please remove 500 pounds from the rear ballast." The operator interface 240 may provide a confirmation notification indicating that no further weight should be added to or removed from the ballast 302 in response to an indication (e.g., from a ballast weight sensor 260) that the ballast 302 has reached the desired weight.

In some embodiments, the notification instructs an operator to move the ballast 302. By way of example, the ballast actuator 306 may be manually controlled (e.g., through the operator interface 240, through a crank on the ballast actuator 306, etc.). In such an embodiment, the notification may provide an operator with the direction that the ballast 302 should move and/or the distance that the ballast 302 should move. By way of example, the operator interface 240 may provide a text notification stating "please move the front ballast forward" or "please move the front ballast rearward." The operator interface 240 may provide a confirmation notification indicating that no further movement of the ballast 302 is required in response to an indication (e.g., from the front axle torque sensors 220, the rear axle torque sensors 222, the front axle force sensors 230 and/or the rear axle force sensors 232) the center of gravity C has reached the desired range of positions and/or an indication (e.g., from the ballast position sensors 308) that the ballast 302 has reached the desired position.

In step 410 of the method 400, the output of the prime mover 52 is varied. By way of example, the controller 210 may provide commands to the prime mover 52 that limit operation of the prime mover 52 (e.g., that limit a rotational speed of the prime mover 52, that limit an output power of the prime mover 52, etc.). The controller 210 may utilize feedback from the speed sensor 53 in such an operation. In some embodiments, the controller 210 is configured to limit the operation or the performance of the prime mover 52 in response to an indication that the center of gravity C is outside the desired range of positions. By way of example, the controller 210 may limit the rotational speed of the prime mover 52 to below a threshold speed (e.g., limit the rotational speed to below 3000 RPM when the normal operating speed of the prime mover 52 is 4000 RPM, etc.). By way of another example, the controller 210 may limit the output power of the prime mover 52 to below a threshold power (e.g., limit the output power of the prime mover 52 to below 80% of the maximum output power, etc.). By limiting the operation of the prime mover 52 when the center of gravity C is outside of the desired range of positions, the controller 210 may limit the stresses on the driveline 50 and reduce component wear.

In some embodiments, the controller 210 is configured to provide a notification to the operator indicating that the operation of the prime mover 52 is limited due to an undesirable condition of the ballast 302. In some such embodiments, the notification is provided whenever the center of gravity C is outside of the desired range of positions. By way of example, the operator interface 240 may provide a text notification stating that "vehicle CG outside of operating range—output power of the engine is limited to 75% capacity." In other embodiments, the notification is provided when the controller 210 determines that the center of gravity C cannot be returned to the desired range until weight is added to or removed from the ballast 302. By way of example, the operator interface 240 may provide a text notification stating that "vehicle CG outside of operating range—output power of the engine is limited to 50% capacity. Please add 1000 pounds to front ballast to return engine to normal operating conditions."

In step 412 of the method 400, the ballast 302 is repositioned. Specifically, the controller 210 controls the ballast actuator 306 to reposition the ballast 302. In some embodiments, the controller 210 repositions the ballast 302 based on the selected operating mode, the load data received in step 404, the desired range of position of the center of gravity C, the determined position of the center of gravity C, operator inputs, or other information. By way of example, the operating mode may have a predetermined position and/or weight of the ballast 302. By way of another example, the operating mode may have a predetermined relationship between the load data and the desired position of the ballast 302. By way of another example, the controller 210 may control the ballast 302 to shift the center of gravity C into the desired range of positions.

Table 1 below illustrates the effect of shifting the ballast 302, according to an exemplary embodiment. In this embodiment, the total weight of the vehicle 10 is assumed to be 41,175 lbs, the ballast 302 is assumed to be 2160 lbs, and the weight of the vehicle 10 is assumed to be distributed evenly between the front tractive assembly 70 and the rear tractive assembly 80 when the ballast 302 is not extended. "Shift distance" indicates the distance that the ballast 302 has been shifted. "Front weight" and "rear weight" indicate the weight of the vehicle 10 that is supported by the front tractive assembly 70 and the rear tractive assembly 80, respectively. "Front percent" and "rear percent" indicate the portion of the total vehicle weight that is supported by the front tractive assembly 70 and the rear tractive assembly 80, respectively. "Effective ballast change" indicates the change in weight of the ballast 302 that would be necessary to achieve the same effect if the ballast 302 had not been shifted. As shown, the ballast assembly 300 is able to achieve significant changes in weight distribution without increasing the weight of the ballast 302.

TABLE 1

| Shift Distance (inches) | Front Weight (pounds) | Rear Weight (pounds) | Front Percent (%) | Rear Percent (%) | Effective Ballast Change (%) |
| --- | --- | --- | --- | --- | --- |
| 1 | 20605 | 20570 | 50.0 | 50.0 | 0.5 |
| 6 | 20692 | 20483 | 50.3 | 49.7 | 3.2 |
| 12 | 20796 | 20379 | 50.5 | 49.5 | 6.3 |
| 18 | 20901 | 20274 | 50.8 | 49.2 | 9.5 |
| 24 | 21005 | 20170 | 51.0 | 49.0 | 12.6 |

Solid Ballast Configuration

Referring to FIGS. 6 and 10-16, the ballast assembly 300 is shown according to a first exemplary embodiment. In this embodiment, the frame 12 of the vehicle 10 includes a first portion or stationary portion, shown as main frame 310, and a second portion or removable portion, shown as removable frame 312. The main frame 310 may be coupled to the body 20, the cab 30, the driveline 50, and the implements 190. The removable frame 312 may be removably coupled to the main frame 310 (e.g., to facilitate aftermarket implementation of the ballast assembly 300 with the vehicle 10, to facilitate maintenance of the ballast assembly 300, etc.). In other embodiments, the main frame 310 and the removable frame 312 are integrally formed such that the frame 12 includes one continuous piece.

The ballast 302 includes a structural portion or frame, shown as ballast frame 320. The ballast frame 320 includes an interface portion, shown as plate 322, that is coupled to a pair of ballast supports 304 and a ballast actuator 306. A distal end portion of the ballast frame 320 includes an interface portion, shown as weight interface 324. The weight interface 324 defines a laterally-extending recess or groove.

The ballast frame 320 supports a series of weights, masses, or ballast plates, shown as plates 330. The plates 330 are solid. In some embodiments, the plates 330 are made from cast iron or steel. In some embodiments, each of the plate 330 are substantially identical. In some embodiments, each plate 330 weighs approximately 120 pounds. The plates 330 are arranged laterally along the weight interface 324. Each plate 330 defines a series of protrusions, shown as frame interfaces 332, that engage the weight interface 324 to couple the plates 330 to the ballast frame 320. By way of example, the frame interfaces 332 may engage the laterally-extending recess of the weight interface 324.

In some embodiments, the plates 330 are removably coupled to the weight interface 324. By way of example, the plates 330 may slide laterally outward, out of the laterally-extending recess of the weight interface 324. In some embodiments, one or more fasteners (e.g., bolts) engage the plate 330 and/or the weight interface 324 to selectively prevent removal of the plate 330. Because the plates 330 are removably coupled to the weight interface 324, plates 330 may be added or removed to increase or decrease the weight of the ballast 302. By way of example, the ballast 302 may include six plates 330 in a first, relatively light configuration and twelve plates 330 in a second, relatively heavy configuration.

In the embodiment shown in FIGS. 6 and 10-16, the ballast supports 304 are sliders or linear guides that each include an outer portion, housing, or bushing, shown as slider body 340, and an inner portion or rod, shown as slider rod 342. The sliders are each laterally offset from a longitudinal centerline of the vehicle 10. The slider bodies 340 are each coupled (e.g., fixedly coupled) to the removable frame 312. The slider rods 342 are each coupled (e.g., fixedly coupled) to the plate 322 of the ballast frame 320. The slider bodies 340 each extend longitudinally and each include a longitudinal passage that receives a slider rod 342. The slider rods 342 are configured to move longitudinally relative to the slider bodies 340 as the ballast 302 moves relative to the frame 12. In some embodiments, the slider body 340 includes a boot made from a compliant material that prevent dust or other debris from entering between the slider body 340 and the slider rod 342. In some embodiments, the ballast supports 304 constrain movement of the ballast 302 to purely longitudinal motion (e.g., such that lateral and vertical movement of the ballast 302 is limited). The slider bodies 340 and the slider rods 342 may be configured to have minimal friction relative to one another, facilitating movement of the slider rods 342, even when supporting the weight of the ballast 302.

In other embodiments, the ballast supports 304 are otherwise configured. By way of example, the ballast supports 304 may include a tubular member that is coupled to the ballast frame 320 and a receiver that is coupled to the frame 12. The receiver may include a series of ball bearings that each an exterior surface of the tubular member, supporting the tubular member while permitting longitudinal movement of the tubular member with minimal friction.

In the embodiment shown in FIGS. 6 and 10-16, the ballast actuator 306 is a linear actuator including a body or housing, shown as actuator body 350, and a shaft or rod, shown as actuator rod 352. In some embodiments, the linear actuator is a hydraulic or pneumatic cylinder. In other embodiments, the linear actuator is an electric motor or another type of actuator. The actuator body 350 is coupled to the removable frame 312, and the actuator rod 352 is coupled to the plate 322 of the ballast frame 320. As shown, the actuator body 350 is pivotally coupled to an interface, shown as clevis 354, that is formed by the removable frame 312. In operation, the ballast actuator 306 extends to move the ballast 302 longitudinally outward (e.g., farther from the center of gravity C) and retracts to move the ballast 302 longitudinally inward (e.g., closer to the center of gravity C). The slider bodies 340 may support the weight of the ballast 302 such that the primary loading experienced by the ballast actuator 306 is along the length of the ballast actuator 306.

Figure 10:
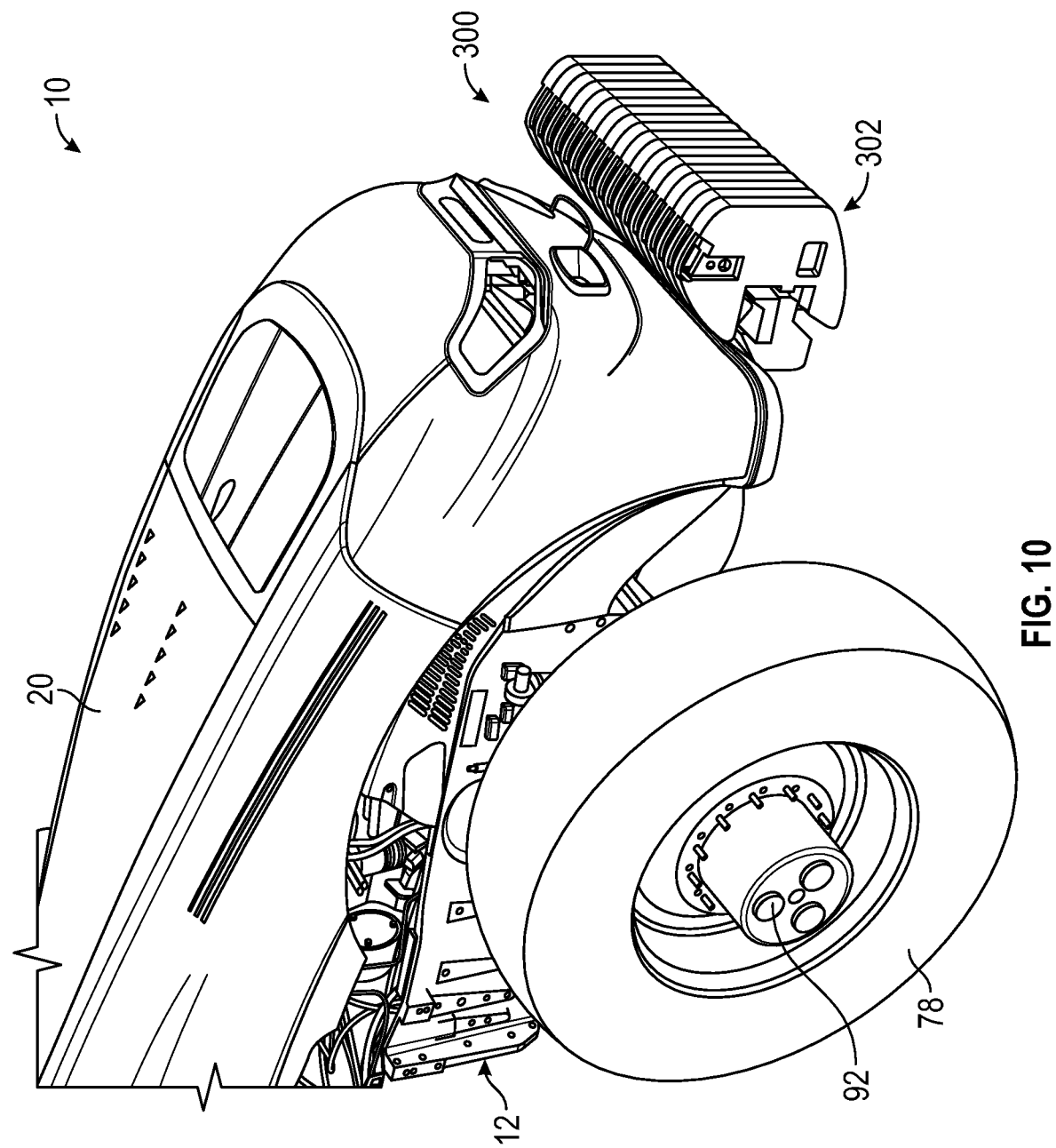
FIG. 10 is a top perspective view of the vehicle of FIG. 1 including the ballast assembly of FIG. 6.
Figure 11:
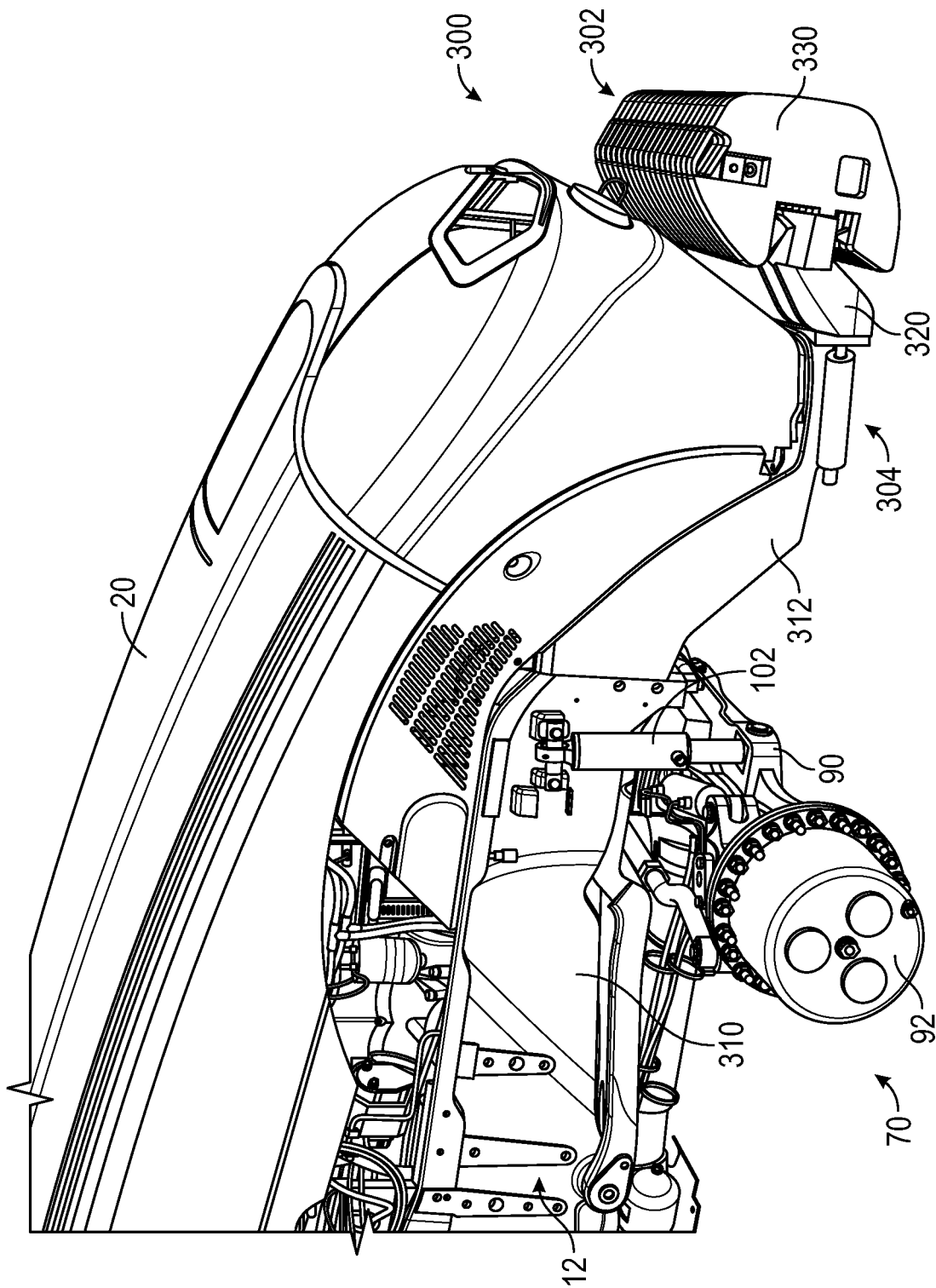
FIG. 11 is a right side view of the vehicle of FIG. 1 including the ballast assembly of FIG. 6.
Figure 12:
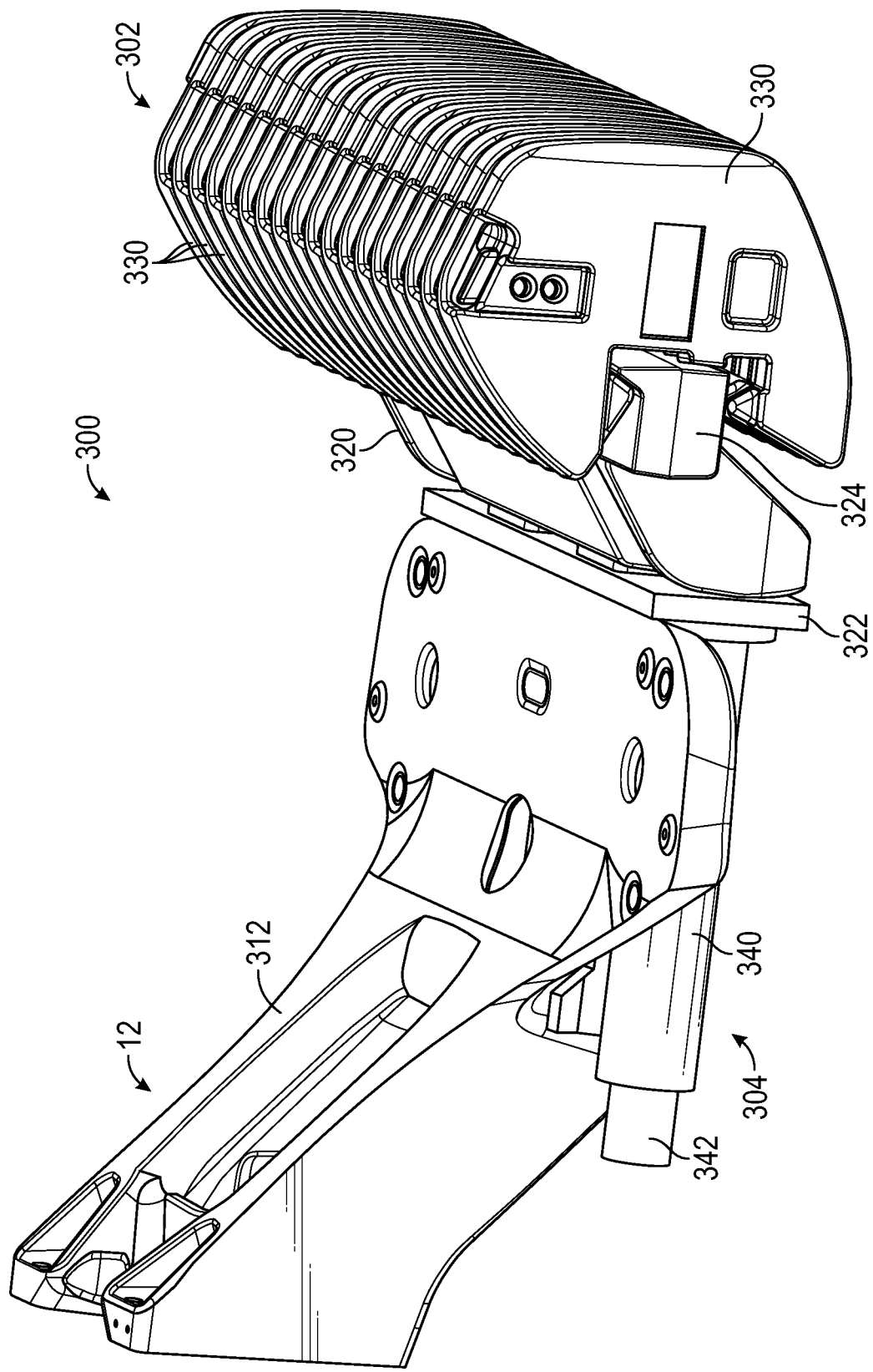
FIG. 12 is a top perspective view of the ballast assembly of FIG. 6 in a retracted configuration.
Figure 13:
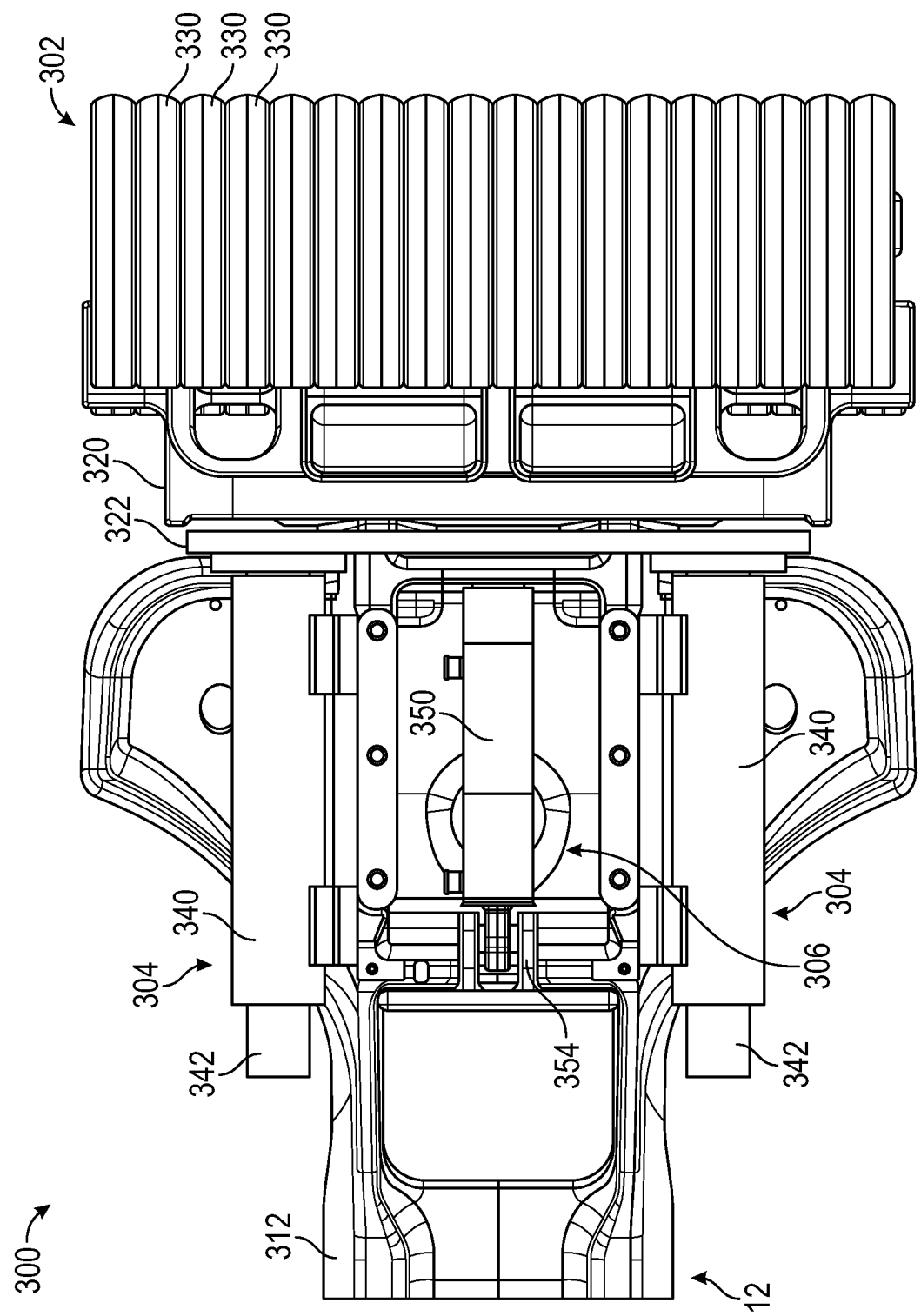
FIG. 13 is a bottom view of the ballast assembly of FIG. 6 in the retracted configuration.
Figure 14:
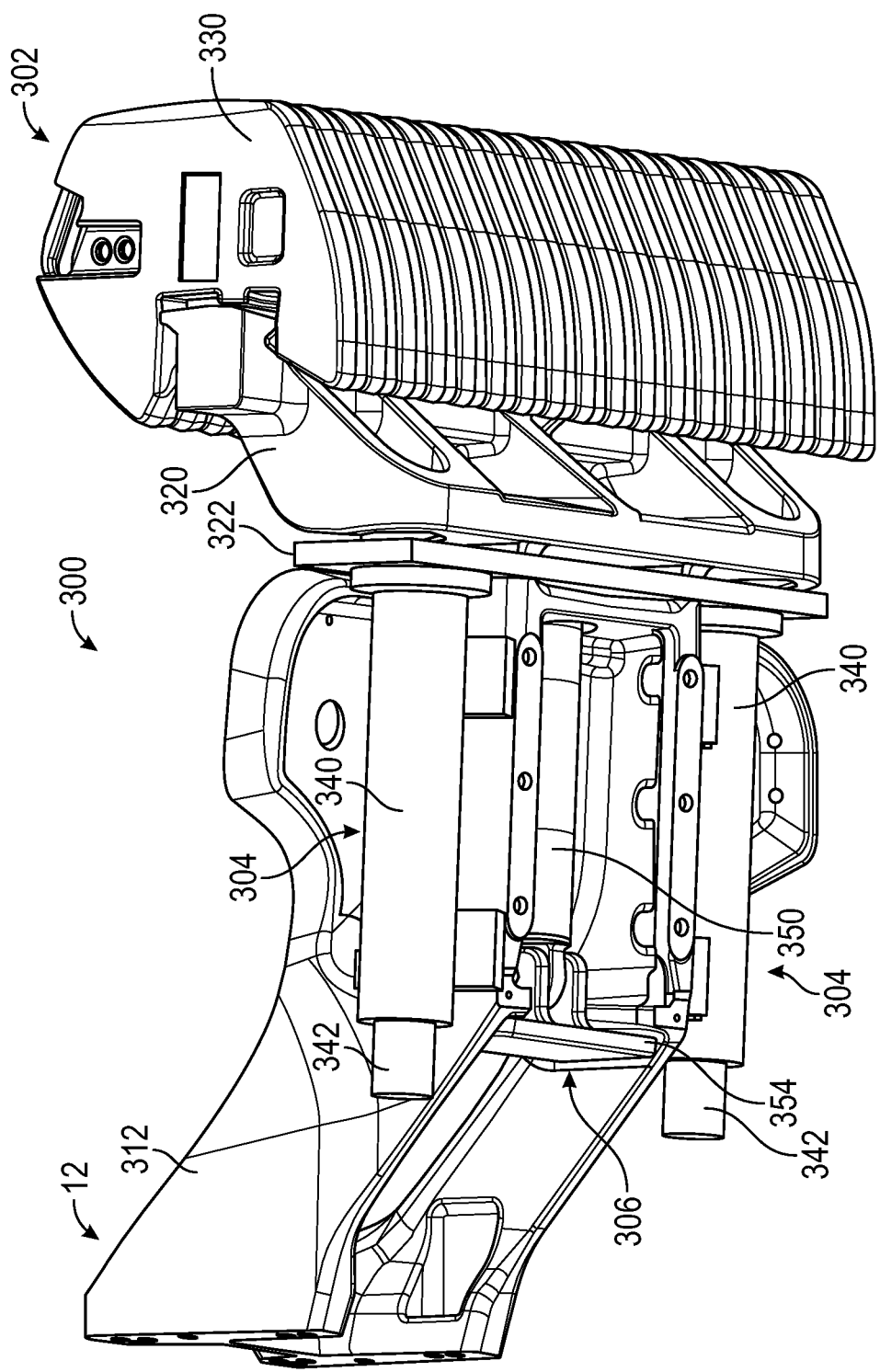
FIG. 14 is a bottom perspective view of the ballast assembly of FIG. 6 in the retracted configuration.
Figure 15:
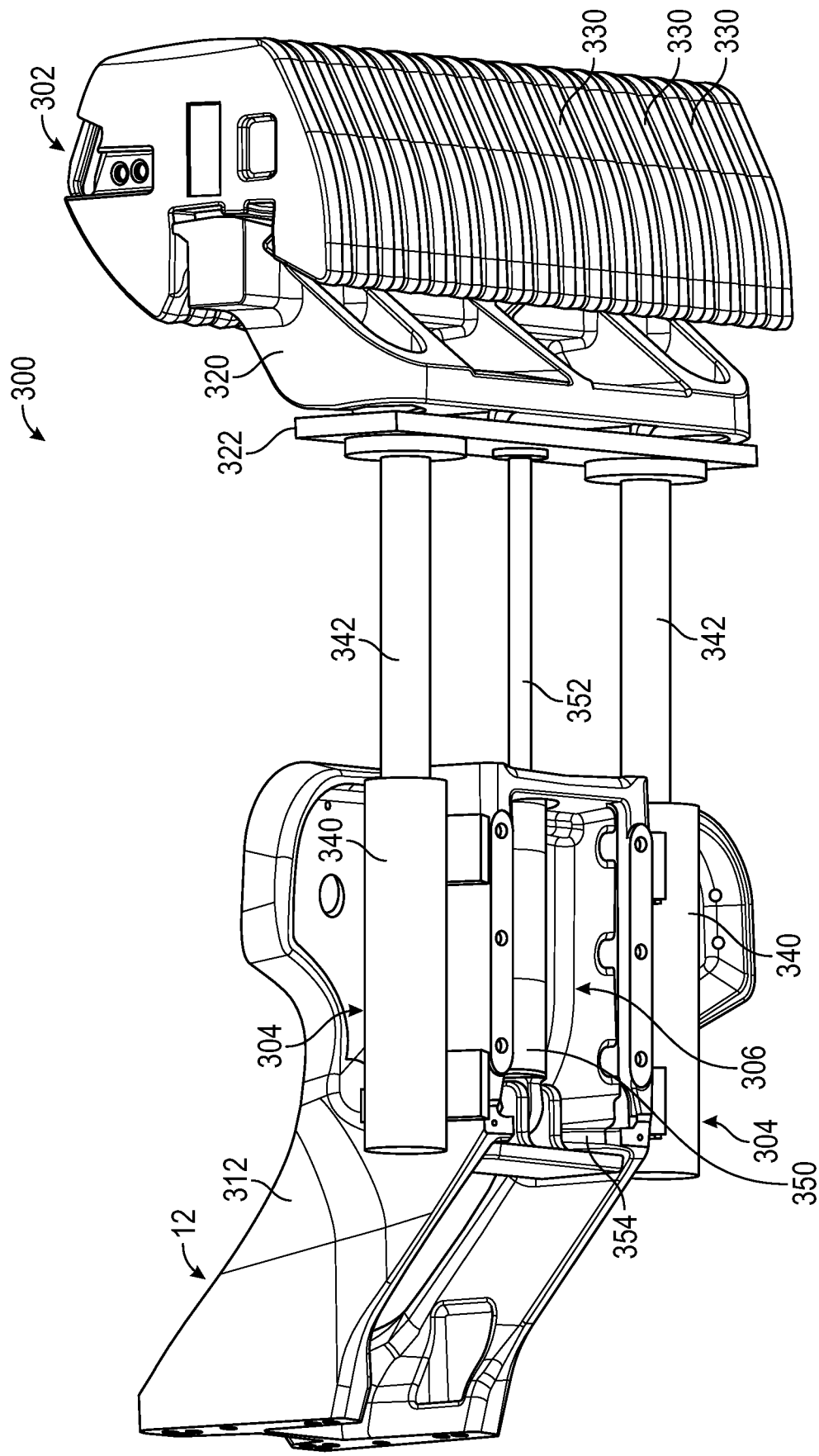
FIG. 15 is a bottom perspective view of the ballast assembly of FIG. 6 in an extended configuration.
Figure 16:
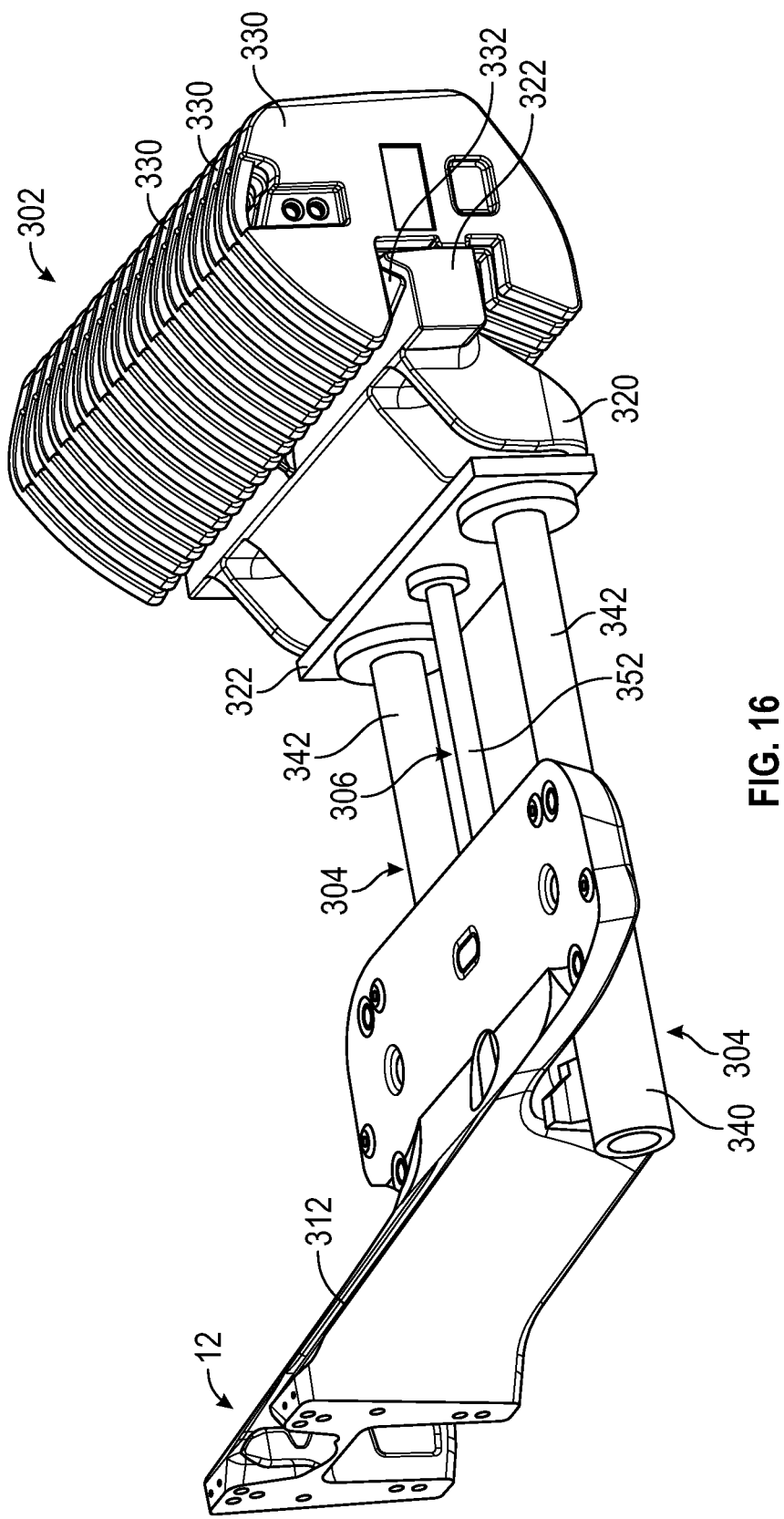
FIG. 16 is a top perspective view of the ballast assembly of FIG. 6 in the extended configuration.

As shown in FIG. 10, the ballast 302 is positioned forward of the body 20 when fully retracted and extends even further forward when fully extended. In other embodiments, the ballast 302 is otherwise positioned throughout the vehicle 10. By way of example, the ballast 302 may be positioned directly beneath the body 30. By way of another example, the ballast 302 may extend rearward of the body 20.

Fluid Ballast Configuration

Figure 17:
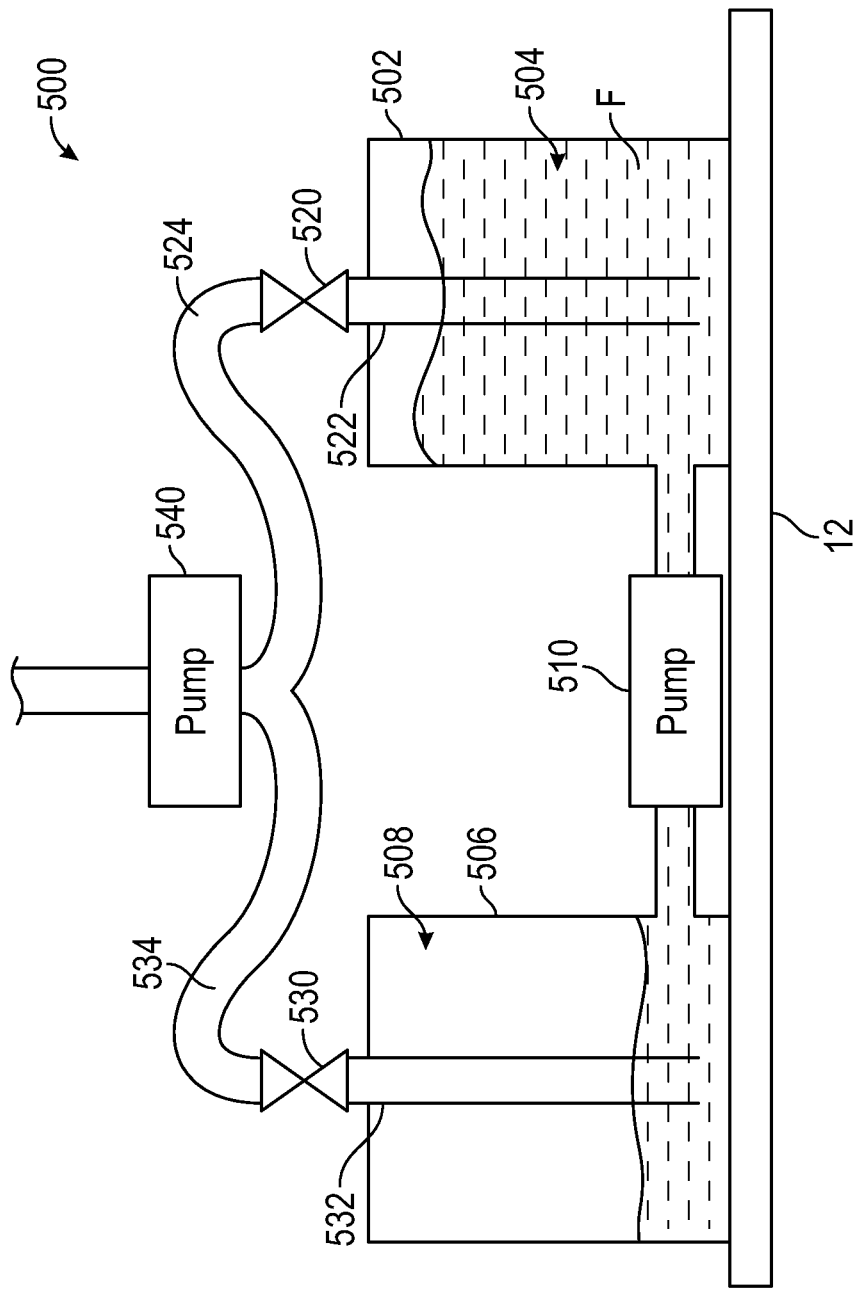
FIG. 17 is a schematic block diagram of a ballast assembly for a vehicle, according to another exemplary embodiment.

FIG. 17 illustrates an alternative embodiment of the ballast assembly 300, shown as ballast assembly 500. The ballast assembly 500 may be substantially similar to the ballast assembly 300 except as otherwise specified herein. Instead of using discrete, solid weights such as the plates 330 to provide the mass of the ballast, the ballast assembly 500 utilizes a liquid, shown as fluid F, as the ballast 302.

The ballast assembly 500 includes a first reservoir, tank, container, vessel, drum, receptacle, or holder, shown as tank 502, that defines an internal volume or space, shown as chamber 504. The chamber 504 may be filled (e.g., partially or completely) with the fluid F. The ballast assembly 500 further includes a second reservoir, tank, container, vessel, drum, receptacle, or holder, shown as tank 506, that defines an internal volume or space, shown as chamber 508. The chamber 508 may also be filled (e.g., partially or completely) with the fluid F.

The chamber 504 and the chamber 508 may be selectively fluidly coupled to one another through one or more pumps or valves, shown as pump 510. The pump 510 is configured to move the fluid F between the chamber 504 and the chamber 508. The tank 502 and the tank 506 are both coupled to the frame 12. In some embodiments, the tank 502 and the tank 506 are longitudinally offset from one another. By way of example, the tank 502 may be positioned near the front end of the frame 12, and the tank 506 may be positioned near the rear end of the frame 12. As the pump moves the fluid F between the tank 502 and the tank 506, the center of gravity C of the vehicle 10 shifts accordingly. Accordingly, the distribution of the fluid F between the tank 502 and the tank 506 can be varied to control the position of the center of gravity C. In this way, the pump 510 acts as a ballast actuator 306, and the tank 502 and the tank 506 act as ballast supports 304. One or more floats may be placed within the tanks 502 and 506 to act as ballast position sensors 308. The range of motion of the fluid F may be considered the path between the tank 502 and the tank 506. One end of the range of motion may be a configuration in which all of the fluid F is contained within the tank 502, and another end of the range of motion may be a configuration in which all of the fluid F is contained within the tank 506.

In some embodiments, the fluid F can be added to or removed from the ballast assembly 500 throughout operation. As shown in FIG. 17, the ballast assembly 500 includes a valve (e.g., a flow control valve, a shutoff valve, etc.), shown as valve 520, the fluidly couples a first conduit, shown as drain pipe 522, to a second conduit, shown as hose 524. The drain pipe 522 is coupled to the tank 502 and fluidly coupled to the chamber 504. In some embodiments, the drain pipe 522 extends near the bottom of the chamber 504 such that tank 502 can be completely drained.

The ballast assembly 500 further includes a valve (e.g., a flow control valve, a shutoff valve, etc.), shown as valve 530, the fluidly couples a third conduit, shown as drain pipe 532, to a fourth conduit, shown as hose 534. The drain pipe 532 is coupled to the tank 506 and fluidly coupled to the chamber 508. In some embodiments, the drain pipe 532 extends near the bottom of the chamber 508 such that tank 506 can be completely drained.

One or more valves or pumps, shown as pump 540, fluidly couple the hoses 524 and 534 with one or more sources or receivers of the fluid. Accordingly, the pump 540 may supply or remove the fluid F. The valves 520 and 530 can be operated to select which tank the fluid F is added to or removed from.

The fluid F may include water, fuel, chemicals, fertilizer, or other fluids. In some embodiments, the fluid F is added or removed solely based on the desired weight of the ballast assembly 500. In other embodiments, the fluid F is utilized by another system of the vehicle 10 throughout operation. By way of example, the fluid F may be a fuel (e.g., diesel, gasoline, etc.) that is consumed by the prime mover 52 throughout operation. Accordingly, the pump 540 may supply the fuel to the prime mover 52 and may supply the fuel to the tanks 502 and 506 from a fill port on the exterior of the vehicle 10.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the driveline 50, the braking system 160, the control system 200, etc.) as shown in the various exemplary embodiments is illustrative only. Additionally, any element disclosed in one embodiment may be incorporated or utilized with any other embodiment disclosed herein.

What is claimed is:

1. A vehicle, comprising:
   a frame;
   a first axle assembly coupled to the frame and including a first pair of tractive elements;
   a second axle assembly coupled to the frame and including a second pair of tractive elements;
   a prime mover coupled to the frame and configured to drive the first axle assembly and the second axle assembly to propel the vehicle;
   a ballast movably coupled to the frame;
   a ballast actuator configured to reposition the ballast relative to the frame to shift a center of gravity of the vehicle relative to the first axle assembly and the second axle assembly;
   an operator interface; and
   a controller operatively coupled to the operator interface and the ballast actuator and configured to:
     receive an indication of a current capability of the vehicle;
     generate a list of operating modes for the vehicle based on the indication of the current capability of the vehicle;
     control the operator interface to provide the list of operating modes to an operator; and
     control the ballast actuator to reposition the ballast based on a selection by the operator from the list of operating modes.

2. The vehicle of claim 1, further comprising a ballast support coupling the ballast to the frame, wherein the first axle assembly is offset longitudinally forward from the second axle assembly, wherein the ballast support is configured to permit longitudinal movement of the ballast relative to the frame, and wherein the ballast support is configured to limit vertical movement of the ballast relative to the frame.

3. The vehicle of claim 1, further comprising:
   a load sensor configured to provide load data indicating a load on the first axle assembly,
   wherein the controller is operatively coupled to the load sensor and configured to control the ballast actuator to reposition the ballast based on the load data from the load sensor.

4. The vehicle of claim 3, wherein the load sensor is a first load sensor and the load data is first load data, further comprising a second load sensor operatively coupled to the controller and configured to provide second load data indicating a load on the second axle assembly, wherein the controller is configured to control the ballast actuator to reposition the ballast based on the first load data and the second load data.

5. The vehicle of claim 4, wherein the controller is configured to control the ballast actuator to reposition the ballast based on a ratio of the load on the first axle assembly to the load on the second axle assembly.

6. The vehicle of claim 3, wherein the load sensor is a force sensor, and wherein the load data indicates a downward force on the first axle assembly.

7. The vehicle of claim 6, further comprising a cylinder coupled to the first axle assembly and the frame, wherein the cylinder is configured to force the frame upward relative to the first axle assembly, and wherein the force sensor is configured to indicate a pressure of a fluid within the cylinder.

8. The vehicle of claim 1, wherein the ballast includes a ballast frame and a plurality of weights each removably coupled to the ballast frame, and wherein a mass of the ballast is reconfigurable by at least one of (a) removing at least one of the weights from the ballast frame or (b) coupling one or more additional weights to the ballast frame.

9. The vehicle of claim 1, wherein the ballast is a fluid, further comprising first tank and a second tank each coupled to the frame and configured to contain the fluid, and wherein the ballast actuator is configured to move the fluid between the first tank and the second tank.

10. A vehicle, comprising:
    a frame;
    a first axle assembly coupled to the frame and including a first pair of tractive elements;
    a second axle assembly coupled to the frame and including a second pair of tractive elements;
    a prime mover coupled to the frame and configured to drive the first axle assembly and the second axle assembly to propel the vehicle;
    a ballast movably coupled to the frame;
    a ballast actuator configured to reposition the ballast relative to the frame to shift a center of gravity of the vehicle relative to the first axle assembly and the second axle assembly;
    a first load sensor configured to provide first load data indicating a load on the first axle assembly;
    a second load sensor configured to provide second load data indicating a load on the second axle assembly; and
    a controller operatively coupled to the first load sensor, the second load sensor, and the ballast actuator and configured to:
      determine, based on at least one of the first load data or the second load data, if the ballast actuator is capable of returning the center of gravity of the vehicle to a desired range of positions by repositioning the ballast; and limit operation of the prime mover in response to a determination that the ballast actuator is not capable of returning the center of gravity of the vehicle to the desired range of positions.

11. A vehicle, comprising:
a frame;
a first axle assembly coupled to the frame and including a first pair of tractive elements;
a second axle assembly coupled to the frame and including a second pair of tractive elements;
a prime mover coupled to the frame and configured to drive the first axle assembly and the second axle assembly to propel the vehicle;
a ballast movably coupled to the frame;
a ballast actuator configured to reposition the ballast relative to the frame to shift a center of gravity of the vehicle relative to the first axle assembly and the second axle assembly;
a torque sensor configured to provide load data indicating a torque on the first axle assembly; and
a controller operatively coupled to the torque sensor and the ballast actuator and configured to control the ballast actuator to reposition the ballast based on the load data from the torque sensor.

12. A vehicle, comprising:
a frame;
a first axle assembly coupled to the frame and including a first pair of tractive elements;
a second axle assembly coupled to the frame and including a second pair of tractive elements;
a prime mover coupled to the frame and configured to drive the first axle assembly and the second axle assembly to propel the vehicle;
a ballast movably coupled to the frame;
a ballast actuator configured to reposition the ballast relative to the frame to shift a center of gravity of the vehicle relative to the first axle assembly and the second axle assembly; and
a controller operatively coupled to the ballast actuator and configured to:
  receive an indication of a type of an implement that is coupled to the frame; and
  control the ballast actuator to reposition the ballast based on the indication of the type of the implement.

13. A vehicle, comprising:
a frame;
a first axle assembly coupled to the frame and including a first pair of tractive elements;
a second axle assembly coupled to the frame and including a second pair of tractive elements;
a prime mover coupled to the frame and configured to drive the first axle assembly and the second axle assembly to propel the vehicle;
a ballast movably coupled to the frame;
a ballast actuator configured to reposition the ballast throughout a range of motion to shift a center of gravity of the vehicle relative to the first axle assembly and the second axle assembly;
a first load sensor configured to provide first load data indicating a load on the first axle assembly;
a second load sensor configured to provide second load data indicating a load on the second axle assembly; and
a controller operatively coupled to the first load sensor, the second load sensor, and the ballast actuator and configured to:
  determine, based on the first load data and the second load data, if the ballast is capable of returning the center of gravity of the vehicle to a desired range of positions while the ballast remains within the range of motion.

14. The vehicle of claim 13, further comprising an operator interface operatively coupled to the controller, wherein the controller is configured to control the operator interface to provide a notification in response to a determination that the ballast is not capable of returning the center of gravity to the desired range without the ballast extending beyond the range of motion, wherein the notification instructs an operator to at least one of (a) add weight to the ballast or (b) remove weight from the ballast.

15. The vehicle of claim 14, wherein the controller is configured to limit operation of the prime mover in response to the determination that the ballast is not capable of returning the center of gravity to the desired range without the ballast extending beyond the range of motion.

16. A vehicle, comprising:
a frame;
a first axle assembly coupled to the frame and including a first pair of tractive elements;
a second axle assembly coupled to the frame and including a second pair of tractive elements;
an engine coupled to the frame and configured to consume a fuel and drive the first axle assembly and the second axle assembly to propel the vehicle;
a first tank and a second tank each coupled to the frame and configured to contain the fuel; and
a ballast actuator configured to move the fuel between the first tank and the second tank to shift a center of gravity of the vehicle relative to the first axle assembly and the second axle assembly,
wherein the first tank is fluidly coupled to the engine such that the first tank supplies the fuel to the engine.

17. A method of operating a vehicle, comprising:
receiving, from a first load sensor, first load data related to a load on a front axle assembly of the vehicle;
receiving, from a second load sensor, second load data related to a load on a rear axle assembly of the vehicle;
determining, based on the first load data and the second load data, a desired position of a ballast that would shift a center of gravity of the vehicle to a desired range of positions;
determining, based on the first load data and the second load data, if the ballast is capable of moving the center of gravity to the desired range without the ballast extending beyond a predetermined range of motion; and
in response to a determination that the ballast is not capable of moving the center of gravity to the desired range without the ballast extending beyond the predetermined range of motion, providing a notification indicating that at least one of (a) weight should be added to the ballast or (b) weight should be removed from the ballast.

18. A ballast assembly for a vehicle, the ballast assembly comprising:
a ballast;
a ballast support coupled to the ballast and configured to movably couple the ballast to a frame of the vehicle, the ballast support permitting longitudinal movement of the ballast;

a ballast actuator coupled to the ballast and configured to shift the ballast relative to the frame of the vehicle;

a ballast position sensor configured to indicate a position of the ballast; and a controller operatively coupled to the ballast actuator and the ballast position sensor and configured to:

receive first torque data indicating a torque on a front axle of the vehicle;

receive second torque data indicating a torque on a second axle of the vehicle;

compare the first torque data and the second torque data;

determine a desired position of the ballast based on the comparison of the first torque data and the second torque data; and control the ballast actuator to move the ballast to the desired position using feedback from the ballast position sensor.

19. The vehicle of claim 1, wherein the indication of the current capability of the vehicle includes at least one of (a) an operator input through the operator interface or (b) sensor data from a sensor.

20. The vehicle of claim 12, wherein the indication of the type of the implement includes at least one of (a) an operator input through an operator interface or (b) sensor data from a sensor.

* * * * *